United States Patent
Choi et al.

(10) Patent No.: US 10,461,901 B2
(45) Date of Patent: Oct. 29, 2019

(54) METHOD AND DEVICE FOR TRANSMITTING DATA FOR PLURALITY OF STATIONS THROUGH PLURALITY OF BANDS IN WIRELESS LAN SYSTEM

(71) Applicant: LG ELECTRONICS INC., Seoul (KR)

(72) Inventors: Jinsoo Choi, Seoul (KR); Hangyu Cho, Seoul (KR); Wookbong Lee, Seoul (KR); Kiseon Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 25 days.

(21) Appl. No.: 15/545,664

(22) PCT Filed: Jan. 22, 2016

(86) PCT No.: PCT/KR2016/000747
§ 371 (c)(1),
(2) Date: Jul. 21, 2017

(87) PCT Pub. No.: WO2016/117972
PCT Pub. Date: Jul. 28, 2016

(65) Prior Publication Data
US 2018/0006781 A1 Jan. 4, 2018

Related U.S. Application Data

(60) Provisional application No. 62/106,231, filed on Jan. 22, 2015, provisional application No. 62/107,509, (Continued)

(51) Int. Cl.
*H04L 5/00* (2006.01)
*H04W 72/04* (2009.01)
(Continued)

(52) U.S. Cl.
CPC .......... *H04L 5/0041* (2013.01); *H04L 5/0048* (2013.01); *H04L 5/0073* (2013.01);
(Continued)

(58) Field of Classification Search
CPC ... H04L 5/0048; H04L 5/0073; H04L 5/0094; H04L 27/26; H04W 72/0406; H04W 84/12
See application file for complete search history.

(56) References Cited

U.S. PATENT DOCUMENTS

2005/0265223 A1* 12/2005 Song ................ H04L 5/006
370/208
2011/0013568 A1* 1/2011 Yim ................ H04W 28/16
370/329

(Continued)

FOREIGN PATENT DOCUMENTS

| KR | 10-2008-0030907 A | 4/2008 |
| KR | 10-2012-0028203 A | 3/2012 |
| KR | 10-2014-0006723 A | 1/2014 |

OTHER PUBLICATIONS

U.S. Appl. No. 62/033,350, Chen, filed Aug. 5, 2014 (Year: 2014).*
(Continued)

*Primary Examiner* — Brandon M Renner
*Assistant Examiner* — Jay L Vogel
(74) *Attorney, Agent, or Firm* — Lee Hong Degerman Kang Waimey

(57) ABSTRACT

Proposed are a method and a device for transmitting a signal including a data field in a wireless LAN. For example, an access point (AP) allocates, to a second station, a second frequency band adjacent to a first frequency band, wherein the second frequency band can include a plurality of resource units. In addition, a signal including the data field can be transmitted to the second station through the allocated second frequency band. Furthermore, when the first
(Continued)

frequency band is allocated to the first station, the AP can allocate, to the second station, as a null resource unit, a resource unit adjacent to the first frequency band among the plurality of resource units.

12 Claims, 19 Drawing Sheets

Related U.S. Application Data filed on Jan. 26, 2015, provisional application No. 62/107,516, filed on Jan. 26, 2015.

(51) Int. Cl.
*H04L 27/26* (2006.01)
*H04W 84/12* (2009.01)

(52) U.S. Cl.
CPC ............ *H04L 5/0094* (2013.01); *H04L 27/26* (2013.01); *H04W 72/0406* (2013.01); *H04W 84/12* (2013.01); *H04L 27/2628* (2013.01); *H04W 72/0453* (2013.01)

(56) References Cited

U.S. PATENT DOCUMENTS

| 2011/0075613 | A1  | 3/2011  | Yuan |
|---|---|---|---|
| 2013/0122949 | A1* | 5/2013  | He ........................ H04L 5/0044 455/509 |
| 2013/0286959 | A1  | 10/2013 | Lou et al. |
| 2014/0247780 | A1* | 9/2014  | Jafarian ............ H04W 72/0446 370/329 |
| 2015/0288489 | A1* | 10/2015 | Azizi ................... H04L 1/0057 370/210 |
| 2016/0044675 | A1* | 2/2016  | Chen ................. H03M 13/1102 370/329 |
| 2016/0050672 | A1* | 2/2016  | Chen .................... H04W 72/06 370/329 |

OTHER PUBLICATIONS

U.S. Appl. No. 62/037,542, Chen, filed Aug. 14, 2014 (Year: 2014).*
PCT International Application No. PCT/KR2016/000747 International Search Report dated May 26, 2016, 4 pages.

* cited by examiner

FIG. 1
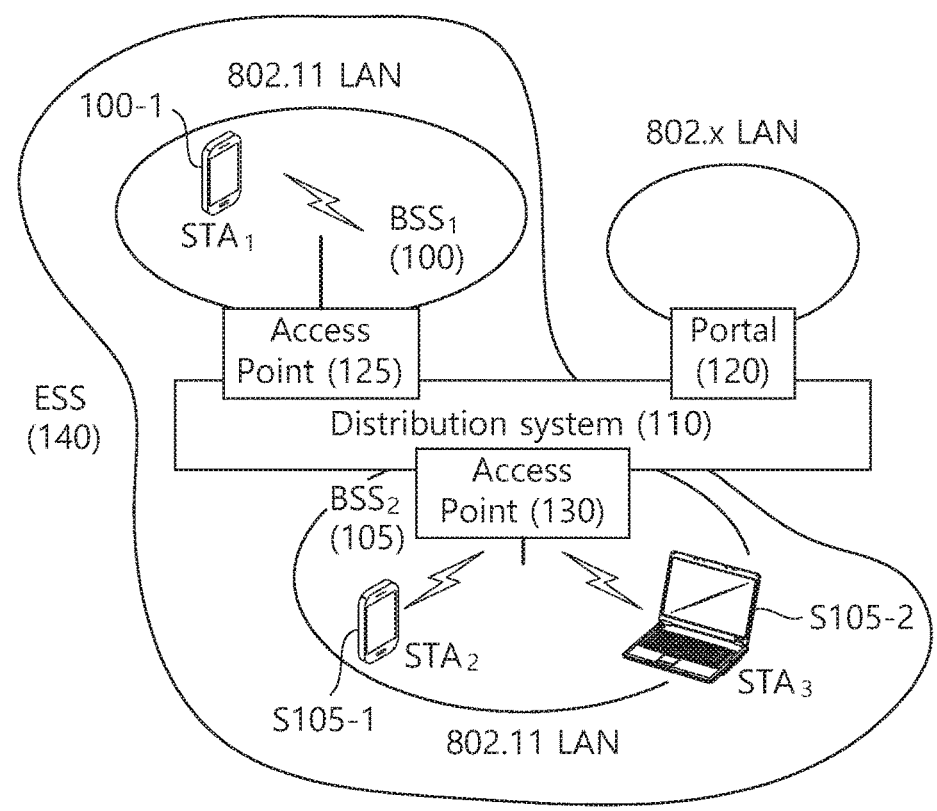
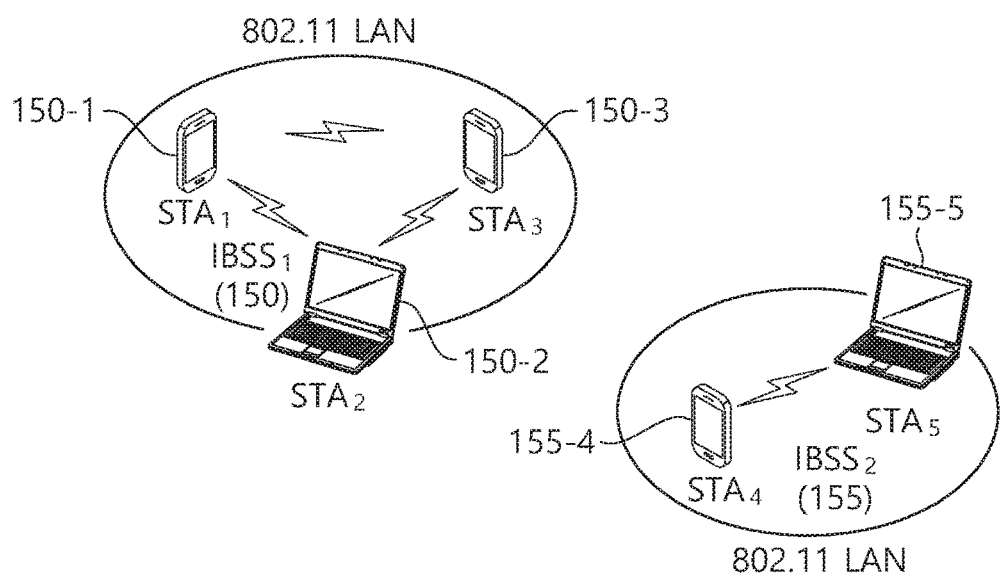

METHOD AND DEVICE FOR TRANSMITTING DATA FOR PLURALITY OF STATIONS THROUGH PLURALITY OF BANDS IN WIRELESS LAN SYSTEM

CROSS-REFERENCE TO RELATED APPLICATIONS

This application is the National Stage filing under 35 U.S.C. 371 of International Application No. PCT/KR2016/000747, filed on Jan. 22, 2016, which claims the benefit of U.S. Provisional Application Nos. 62/106,231 filed on Jan. 22, 2015, No. 62/107,509 filed on Jan. 26, 2015, and No. 62/107,516 filed on Jan. 26, 2015, the contents of which are all hereby incorporated by reference herein in their entirety.

BACKGROUND OF THE INVENTION

Field of the Invention

The present invention relates to wireless communication and, most particularly, to a method and device for transmitting data for a plurality of stations through a plurality of bands in a wireless LAN system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

Technical Objects

An object of this specification is to propose an example of transmitting a data signal for a plurality of stations through a plurality of bands in a wireless LAN system.

More specifically, for example, in the related wireless LAN system, in case of allocating resource or transmitting a signal for a specific station within a non-contiguous band, problems occurred due to interference, and so on. The example of this specification may be used for resolving such problems.

Technical Solutions

This specification proposes a method for transmitting a signal including a data field in a wireless LAN and a station (AP or non-AP) implementing the same.

More specifically, an access point (AP) may allocate a second frequency band being adjacent to a first frequency band to a second station, wherein the second frequency band may include a plurality of resource units.

Additionally, a signal including the data field may be transmitted to the second station through the allocated second frequency band.

Additionally, in case the first frequency band is allocated to a first station, among the plurality of resource units, the AP may allocate a resource unit being adjacent to the first frequency band to the second station as a null resource unit.

Additionally, a transmitting station may allocate a second frequency band being adjacent to a first frequency band as a transmission band targeting an access point (AP), wherein the second frequency band may include a plurality of resource units.

Additionally, a signal including the data field may be transmitted to the AP through the allocated second frequency band.

Furthermore, in case the first frequency band is used by another transmitting station, among the plurality of resource units, the transmitting station may use a resource unit being adjacent to the first frequency band as a null resource unit.

Effects of the Invention

The example of this specification may efficiently transmit a data signal for a plurality of stations through a plurality of bands.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

Figure 2:
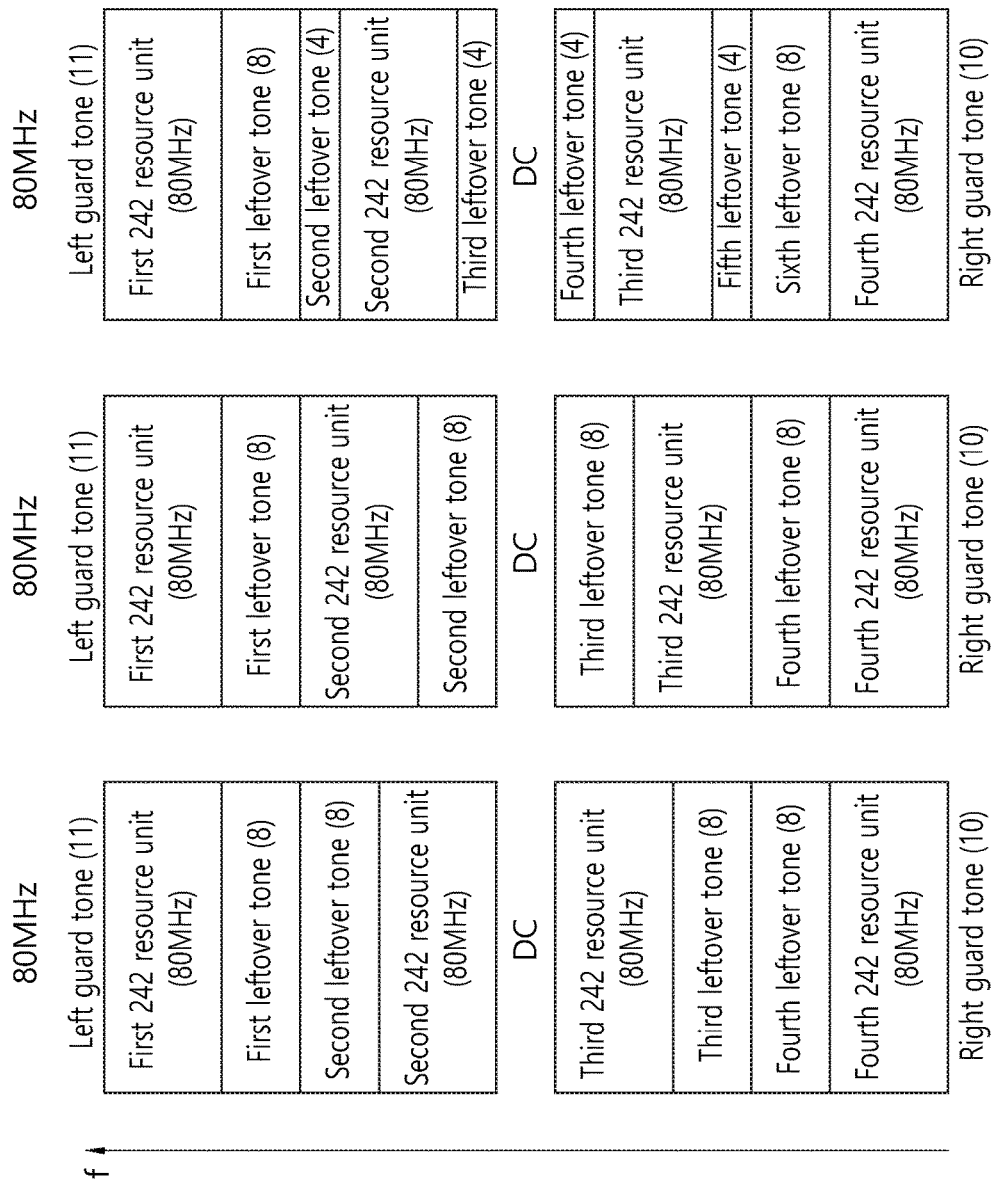
FIG. 2 is a conceptual view illustrating a resource allocation method within an 80 MHz bandwidth according to an exemplary embodiment of the present invention.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Hereinafter, in the embodiment of the present invention, data (alternatively, or a frame) which the AP transmits to the STA may be expressed as a term called downlink data (alternatively, a downlink frame), and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the conventional LAN system, the whole bandwidth may be used for downlink transmission to one STA and uplink transmission to one STA based on single user-orthogonal frequency division multiplexing (SU-OFDM) transmission. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

An example of a time-frequency structure, which is assumed in the Wireless LAN system according to this exemplary embodiment may be as described below.

A fast fourier transform (FFT) size/inverse fast fourier transform (IFFT) size may be defined as N-times (wherein N is an integer, e.g., N=4) of the FFT/IFFT sizes that were used in the legacy Wireless LAN system. For example, 256FFT/IFFT may be applied for a 20 MHz bandwidth, 512FFT/IFFT may be applied for a 40 MHz bandwidth, 1024FFT/IFFT may be applied for an 80 MHz bandwidth, and 2048 FFT/IFFT may be applied to a contiguous 160 MHz bandwidth or a non-contiguous 160 MHz bandwidth.

Subcarrier spacing may correspond to a 1/N-times size (wherein N is an integer, e.g., when N=4, 78.125 kHz) of the subcarrier spacing that was used in the legacy Wireless LAN system.

An inverse discrete fourier transform (IDFT)/discrete fourier transform (DFT) length (or valid symbol length) that is based on IDFT/DFT (or FFT/IFFT) may correspond to N-times of the IDFT/DFT length in the legacy Wireless LAN system. For example, in the legacy Wireless LAN system, in case the IDFT/DFT length is equal to 3.2 μs and N=4, in the Wireless LAN system according to this exemplary embodiment, the IDFT/DFT length may be equal to 3.2 μs*4(=12.8 μs).

The length of an OFDM symbol may correspond to the IDFT/DFT length having a length of a guard interval (GI) added thereto. The length of the GI may have diverse values, such as 0.4 μs, 0.8 μs, 1.6 μs, 2.4 μs, and 3.2 μs.

In case the OFDMA-based method and device according to the exemplary embodiment of the present invention is used, resource allocation units that are each defined to have a different size may be used. The corresponding resource allocation unit may be expressed by using diverse terms, such as unit, resource unit, frequency unit, and so on. And, the size of each unit may be expressed as a tone unit corresponding to the subcarrier. The resource unit may be diversely configured. For example, the resource unit may be defined to have diverse sizes, such as 26 tones, 52 tones, 56 tones, and so on.

The resource unit may be allocated within the entire bandwidth (or available bandwidth) while considering a left guard tone and a left guard tone, which are respectively positioned on each end of the entire bandwidth for interference mitigation, and a direct current (DC) tone, which is positioned at a center of the bandwidth. Moreover, the basic resource unit may also be allocated while considering left-over tones (or remaining tones) that may be used for the purpose of user allocation separation (or per STA resource allocation), common pilot, automatic gain control (AGC), phase tracking, and so on.

The allocation method (allocation number, allocation location, etc.) of the basic resource unit within the entire bandwidth may be configured by considering resource application efficiency, scalability (or extendibility) according to the entire bandwidth. The allocation method of the basic resource unit may be defined in advance or may be signaled based on diverse methods (e.g., signaling based on a signal field that is included in a PPDU header of a PPDU).

Also, according to the exemplary embodiment of present invention, a virtual allocation resource unit including a tone corresponding to a combination between at least a plurality of resource units may be defined, and resource allocation that is based on the virtual allocation resource unit may be performed. The resource allocation that is based on the virtual allocation resource unit may also be expressed differently by using the term virtualization.

The virtual allocation resource unit may correspond to a resource unit for re-using an interleaver size and OFDM numerology (or tone numerology).

More specifically, in case 242 tones are allocated to one STA, the conventional pilot allocation and the convention interleaver size may be used. More specifically, among the 242 tones, pilot tones may be allocated to 8 tones, and data tones may be allocated to the remaining 234 tones. Interleaving that is based on the 234-size interleaver may be performed on the 234-tone data tone.

In this case, the data interleaving procedure and the pilot insertion procedure may be performed identically as in the legacy STA being allocated with 242 tones. More specifically, even in a case when a 242-tone structure is not physically supported, one virtual 242-tone resource unit may be allocated to the STA. In this case, an interleaving procedure using the legacy 234-size interleaver and an insertion procedure of the legacy pilot tone (8 pilot tones) may be used. Such 242-tone resource unit may also be expressed differently by using the term 242-tone or multiple of 242 tones (e.g., 484, 968, and so on). Alternatively, a size of the virtual allocation resource unit may also be determined based on another interleaver size (108, 52, 24, and so on) that was used in the legacy wireless LAN system.

The resource allocation method of each bandwidth, which is described below, is merely an example. And, therefore, resource allocation may also be performed within each bandwidth by using a variety of methods other than the example presented below.

The detailed values shown below may be varied.

For example, for a 20 MHz bandwidth, 6 tones may be defined as a left guard tone, 3 tones may be defined as a direct current (DC) tone, and 5 tones may be defined as a right guard tone, and two 56-tone resource units and five 26-tone resource units may be allocated within the bandwidth. Alternatively, nine 26-tone resource units may be allocated as a virtual allocation resource unit.

For example, a detailed allocation within the frequency band of 20 MHz may correspond to 56/26/26/13/DC/13/26/26/56 or 26/26/13/56/DC/56/13/26/26. 56 indicates a resource unit 56 tones, 26 indicates a resource unit of 26 tones, and 13 indicates a resource unit of 13 tones, which is a divided half of 26 tones.

For example, for a 40 MHz bandwidth, 6 tones may be defined as a left guard tone, 9 tones may be defined as a DC tone, and 5 tones may be defined as a right guard tone, and the remaining 492 tones may be divided into two sets, and three 56-tone resource units and three 26-tone resource units may be allocated to each of the two sets divided from 492 tones. A detailed allocation within the frequency band of 40 MHz may correspond to 56/56/26/26/26/56/DC/56/26/26/26/56/56.

For example, for an 80 MHz bandwidth, 11 tones may be defined as a left guard tone, 3 tones may be defined as a DC tone, and 10 tones may be defined as a right guard tone, and the remaining 1000 tones may be divided into four sets, and four 56-tone resource units and one 26-tone resource unit may be allocated to each of the four divided sets of 250 tones. Nine 26-tone resource units may be allocated to each of the four 250-tone units corresponding to half of 20 MHz or 40 MHz. A detailed allocation within the frequency band of 40 MHz may correspond to 56/56/56/56/26/26/56/56/56/56/DC/56/56/56/56/26/26/56/56/56/56.

Hereinafter, this exemplary embodiment discloses a tone numerology for reducing interference between stations in a wireless LAN system, wherein a station using a 20 MHz bandwidth as a front-end bandwidth, a station using a 40 MHz bandwidth as a front-end bandwidth, and a station using an 80 MHz bandwidth as a front-end bandwidth may co-exist. Meanwhile, since a front-end bandwidth indicates a maximum bandwidth that is available for usage, for example, a station using the 40 MHz bandwidth as the front-end bandwidth may also use a 20 MHz bandwidth.

Hereinafter, a resource allocation method (or tone plan) for the co-existence of devices supporting front-ends of different sizes based on a 242-tone virtual allocation resource unit (or 242-tone resource unit) will be disclosed.

FIG. 2 is a conceptual view illustrating a resource allocation method within an 80 MHz bandwidth according to an exemplary embodiment of the present invention.

In case it is assumed that a left-most guard tone (or left guard tone) of 11 tones, a DC tone of 3 tones, and a right-most guard tone (or right guard tone) of 10 tones are allocated to the 80 MHz front-end bandwidth, FIG. 2 discloses the allocation of resource units within the remaining 1000 tones (1024 tones-24 tones).

1000 tones may be divided into four 250-tone (data tones of 242 tones and leftover tones of 8 tones) units.

Referring to the left side of FIG. 2, 11 (left guard tone)/242/8/8/242/DC/242/8/8/242/10 (right guard tone) may be allocated within the 80 MHz bandwidth. Herein, 242 indicates a 242-tone resource unit, and 8 indicates eight leftover tones.

A plurality of 8-tone leftover tones may be contiguously allocated between 242-tone resource units. The leftover tones being positioned between the 242-tone resource units may be used as guard tones. Two 8-tone leftover tones (a total of 16 leftover tones) may be positioned between a 242-tone resource unit being adjacent to the DC tone and a 242-tone resource unit being adjacent to the left guard tone, and two 8-tone leftover tones (16 tones in total) may be positioned between a 242-tone resource unit being adjacent to the right guard tone and the 242-tone resource unit being adjacent to the DC tone.

Referring to the middle of FIG. 2, 11 (left guard tone)/242/8/242/8/DC/8/242/8/242/10 (right guard tone) may be allocated within the 80 MHz bandwidth. 8 leftover tones may be positioned between 242-tone resource units and to be adjacent to the DC tone (or between a 242-tone resource unit and the DC tone).

Referring to the right side of FIG. 2, 11 (left guard tone)/242/8/4/242/4/DC/4/242/4/8/242/10 (right guard tone) may be allocated within the 80 MHz bandwidth. 4 leftover tones may be respectively allocated to positions being adjacent to the DC tone, and 4 leftover tones and 8 leftover tones may be serially positioned to be adjacent to the 242-tone resource unit being adjacent to the left guard tone. Additionally, 4 leftover tones and 8 leftover tones may be serially positioned to be adjacent to the 242-tone resource unit being adjacent to the right guard tone.

Figure 3:
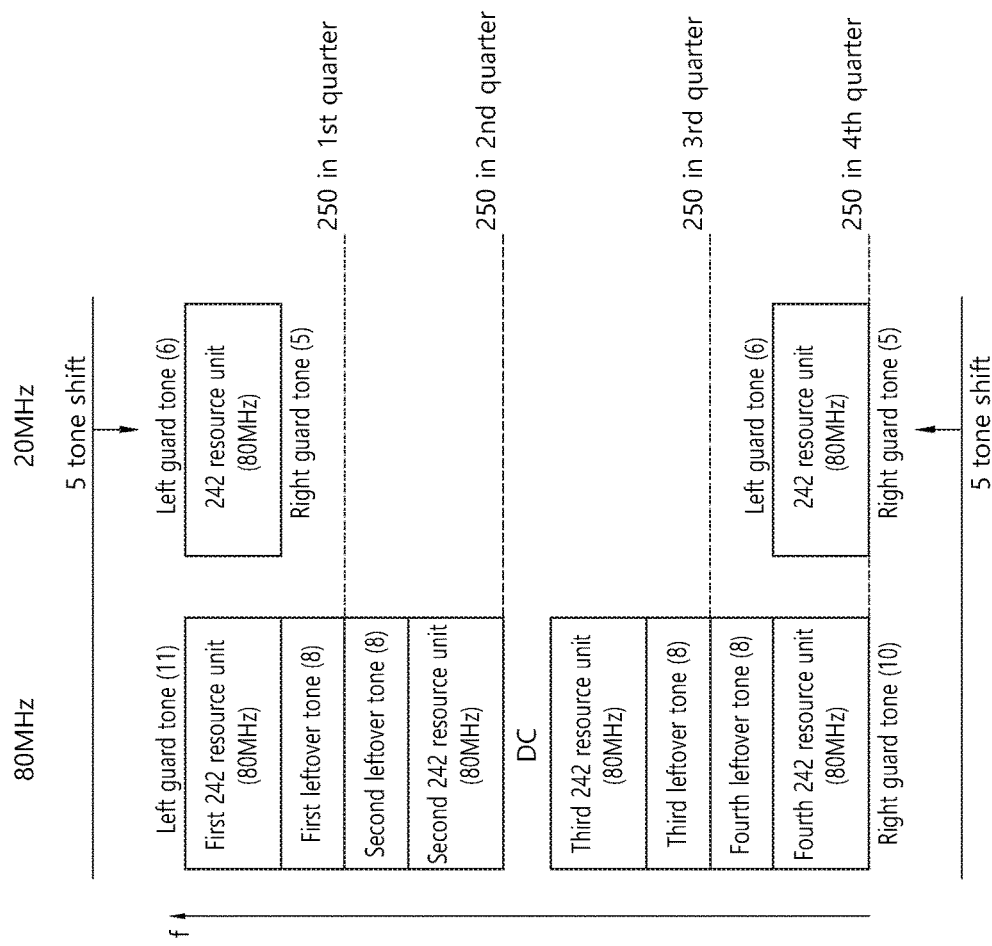
FIG. 3 is a conceptual view illustrating a resource allocation method within a 20 MHz bandwidth according to an exemplary embodiment of the present invention.

FIG. 3 is a conceptual view illustrating a resource allocation method within a 20 MHz bandwidth according to an exemplary embodiment of the present invention.

FIG. 3 discloses a tone numerology for an STA having a 20 MHz front-end bandwidth (or resource allocation within a 20 MHz bandwidth) considering the resource allocation within the 80 MHz bandwidth, which is disclosed on the left side of FIG. 2.

Referring to FIG. 3, a 11-tone left guard tone, a first 242-tone resource unit (80 MHz), an 8-tone first leftover tone, an 8-tone second leftover tone, a second 242-tone resource unit (80 MHz), a DC tone, a third 242-tone resource unit (80 MHz), an 8-tone third leftover tone, a fourth 8-tone leftover tone, a fourth 242-tone resource unit (80 MHz), and a 10-tone right guard tone may be allocated within the 80 MHz bandwidth.

A 6-tone left guard tone, a 242-tone resource unit (20 MHz), and a 5-tone right guard tone may be allocated within the 20 MHz bandwidth.

Hereinafter, although the DC tone will not be considered for simplicity of the description of FIG. 3 to FIG. 5, n number of DC tones may be included in middle positions of 242-tone resource units. In this case, a 6-tone left guard tone, a 242-tone resource unit (20 MHz)+DC tone, and a 5-tone right guard tone may be allocated within the 20 MHz bandwidth.

For example, the allocation position of the first 242-tone resource unit (80 MHz) being adjacent to the 11-tone left guard tone, which is allocated within the 80 MHz bandwidth, and the allocation position of the 242-tone resource unit (20 MHz), which is allocated within the 20 MHz bandwidth, may be configured to be identical to one another. In order to configure the allocation position of the first 242-tone resource unit (80 MHz) to be identical to the allocation position of the 242-tone resource unit (20 MHz), which is allocated within the 20 MHz bandwidth, within the frequency axis, the allocation start position of the left guard tone defined in the 20 MHz bandwidth may be positioned at a location that is shifted by 5 tones along a decreasing direction of the frequency as compared to the allocation start position of the left guard tone defined in the 80 MHz bandwidth.

More specifically, in order to configure the allocation position of the first 242-tone resource unit (80 MHz) to be identical to the allocation position of the 242-tone resource unit (20 MHz), which is allocated within the 20 MHz bandwidth, the allocation start position of the 20 MHz bandwidth may be shifted by 5 tones along the decreasing direction of the frequency based on the allocated start position of the 80 MHz bandwidth.

Conversely, in order to configure the allocation position of the first 242-tone resource unit (80 MHz) to be identical to the allocation position of the 242-tone resource unit (20 MHz), which is allocated within the 20 MHz bandwidth, the allocation start position of the 20 MHz bandwidth may be fixed, and the allocation start position of the 80 MHz bandwidth may be shifted by 5 tones along an increasing direction of the frequency.

Alternatively, the allocation position of the fourth 242-tone resource unit (80 MHz) being adjacent to the 10-tone right guard tone, which is allocated within the 80 MHz bandwidth, and the allocation position of the 242-tone resource unit (20 MHz), which is allocated within the 20 MHz bandwidth, may be configured to be identical to one another. In this case, the allocation start position of the right guard tone defined in the 20 MHz bandwidth may be positioned at a location that is shifted by 5 tones along an increasing direction of the frequency as compared to the allocation start position of the right guard tone defined in the 80 MHz bandwidth.

More specifically, in order to configure the allocation position of the fourth 242-tone resource unit (80 MHz) to be identical to the allocation position of the 242-tone resource unit (20 MHz), which is allocated within the 20 MHz bandwidth, the allocation start position of the 20 MHz bandwidth may be shifted by 5 tones along the increasing direction of the frequency based on the allocated start position of the 80 MHz bandwidth.

Conversely, in order to configure the allocation position of the fourth 242-tone resource unit (80 MHz) to be identical to the allocation position of the 242-tone resource unit (20 MHz), which is allocated within the 20 MHz bandwidth, the allocation start position of the 20 MHz bandwidth may be fixed, and the allocation start position of the 80 MHz bandwidth may be shifted by 5 tones along a decreasing direction of the frequency.

In order to configure the allocation position of the second 242-tone resource unit (80 MHz) and the allocation position of the 242-tone resource unit (20 MHz), which is allocated within the 20 MHz bandwidth, separate shifting is not required to be performed. Similarly, in order to configure the allocation position of the third 242-tone resource unit (80 MHz) and the allocation position of the 242-tone resource unit (20 MHz), which is allocated within the 20 MHz bandwidth, separate shifting is not required to be performed.

Figure 4:
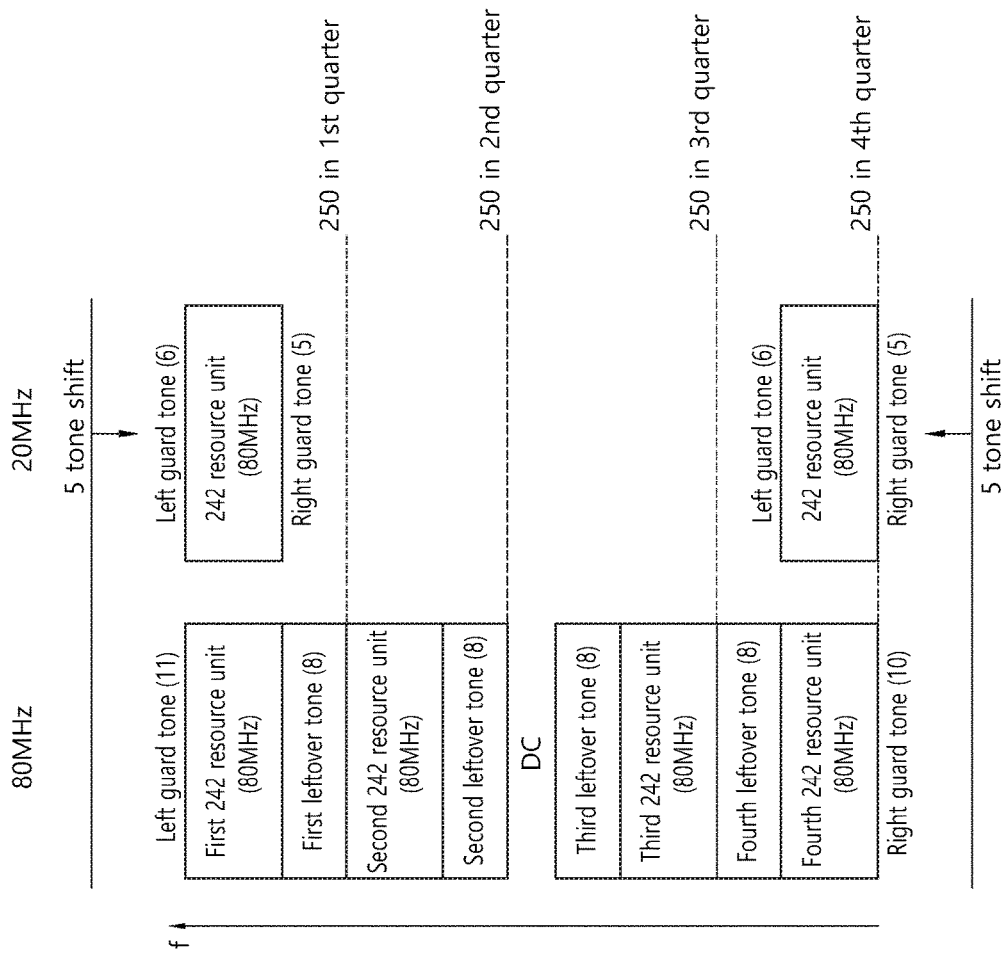
FIG. 4 is a conceptual view illustrating a resource allocation method within a 20 MHz bandwidth according to an exemplary embodiment of the present invention.

FIG. 4 is a conceptual view illustrating a resource allocation method within a 20 MHz bandwidth according to an exemplary embodiment of the present invention.

FIG. 4 discloses a tone numerology for an STA having a 20 MHz front-end bandwidth considering the resource allocation within the 80 MHz bandwidth, which is disclosed in the middle of FIG. 2.

As shown in the drawing, the technical characteristics that are described in FIG. 3 are equally applied in FIG. 4 with the exception that, in comparison with FIG. 3, the detailed positions of the tones are different. Therefore, additional description of FIG. 4 will be omitted.

Figure 5:
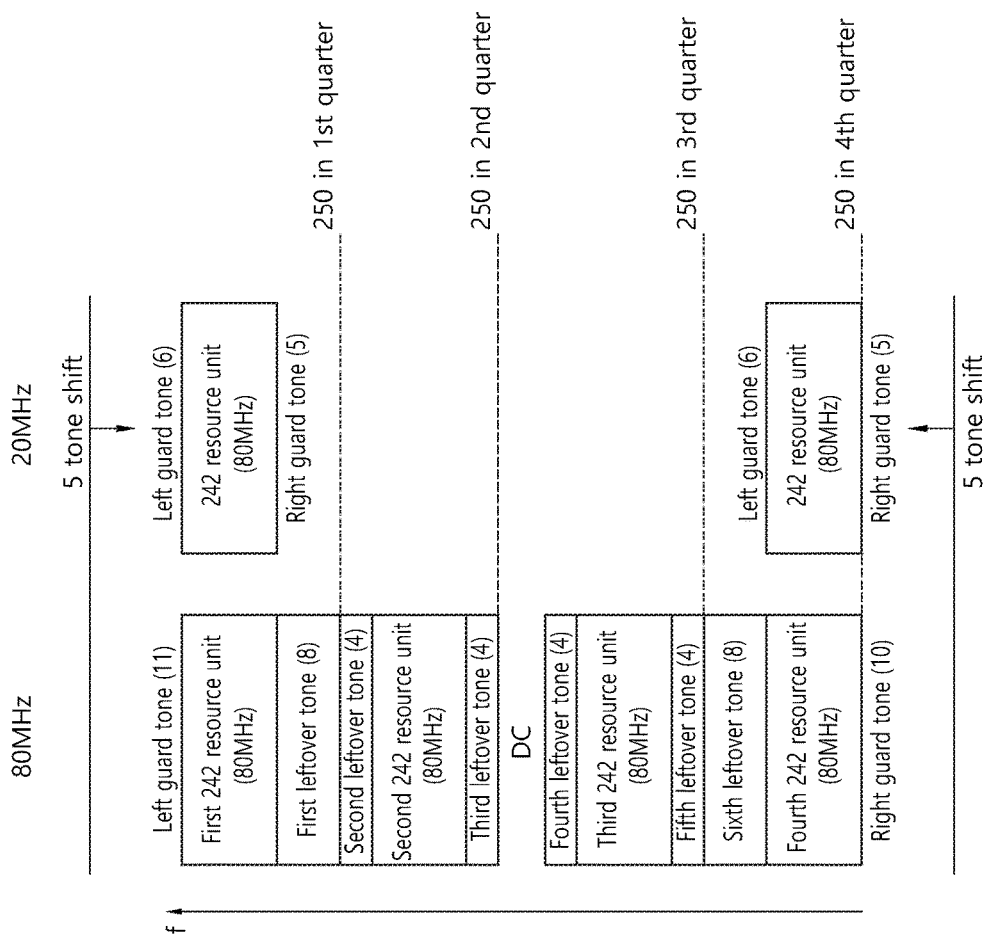
FIG. 5 is a conceptual view illustrating a resource allocation method within a 20 MHz bandwidth according to an exemplary embodiment of the present invention.

FIG. 5 is a conceptual view illustrating a resource allocation method within a 20 MHz bandwidth according to an exemplary embodiment of the present invention.

FIG. 5 discloses a tone numerology for an STA having a 20 MHz front-end bandwidth considering the resource allocation within the 80 MHz bandwidth, which is disclosed on the right side of FIG. 2.

As shown in the drawing, the technical characteristics that are described in FIG. 3 are equally applied in FIG. 5 with the exception that, in comparison with FIG. 3, the detailed positions of the tones are different. Therefore, additional description of FIG. 5 will be omitted.

Figure 6:
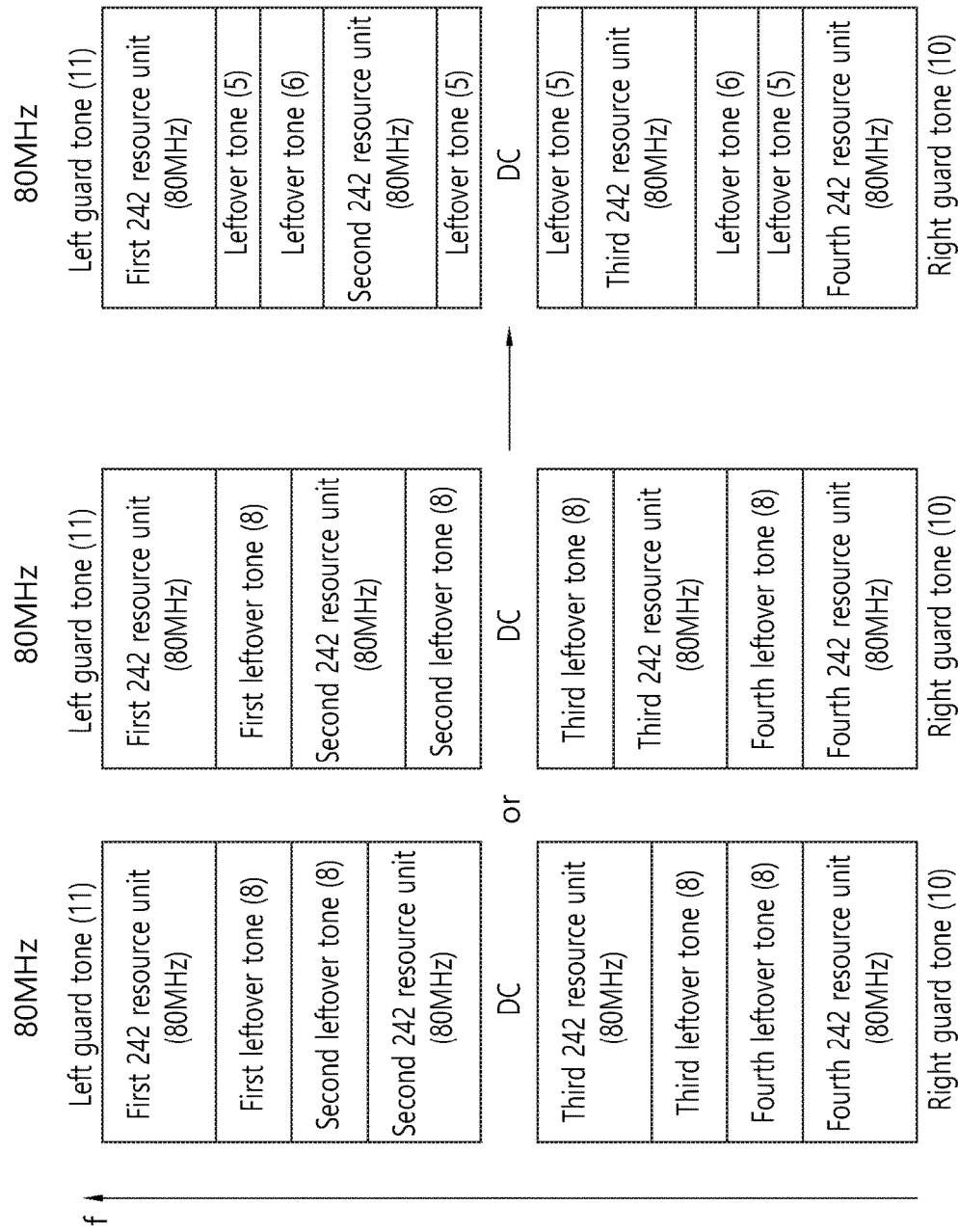
FIG. 6 is a conceptual view illustrating an allocation of a left guard tone according to an exemplary embodiment of the present invention.

FIG. 6 is a conceptual view illustrating an allocation of a left guard tone according to an exemplary embodiment of the present invention.

Referring to FIG. 6, an 8-tone left guard tone may be divided into a 5-tone left guard tone and a 3-tone left guard tone, and a 6-tone left guard tone may be generated by extracting a 3-tone left guard tone from each of the two 8-tone left guard tones and then combining the extracted 3-tone left guard tones. The position of the 6-tone left guard tone may be allocated to correspond to the position of the 6-tone left guard tone within the 20 MHz bandwidth, and the position of the remaining 5-tone (8 tones-3 tones) left guard tone may be allocated to correspond to the position of the 5-tone right guard tone within the 20 MHz bandwidth.

Although the DC tone within the 20 MHz bandwidth has not been defined in FIG. 2 to FIG. 5, it is preferable that the DC tone is defined in the 20 MHz bandwidth. More specifically, it is preferable that a predetermined number of tones are additionally allocated within the 20 MHz bandwidth as the DC tone.

Figure 7:
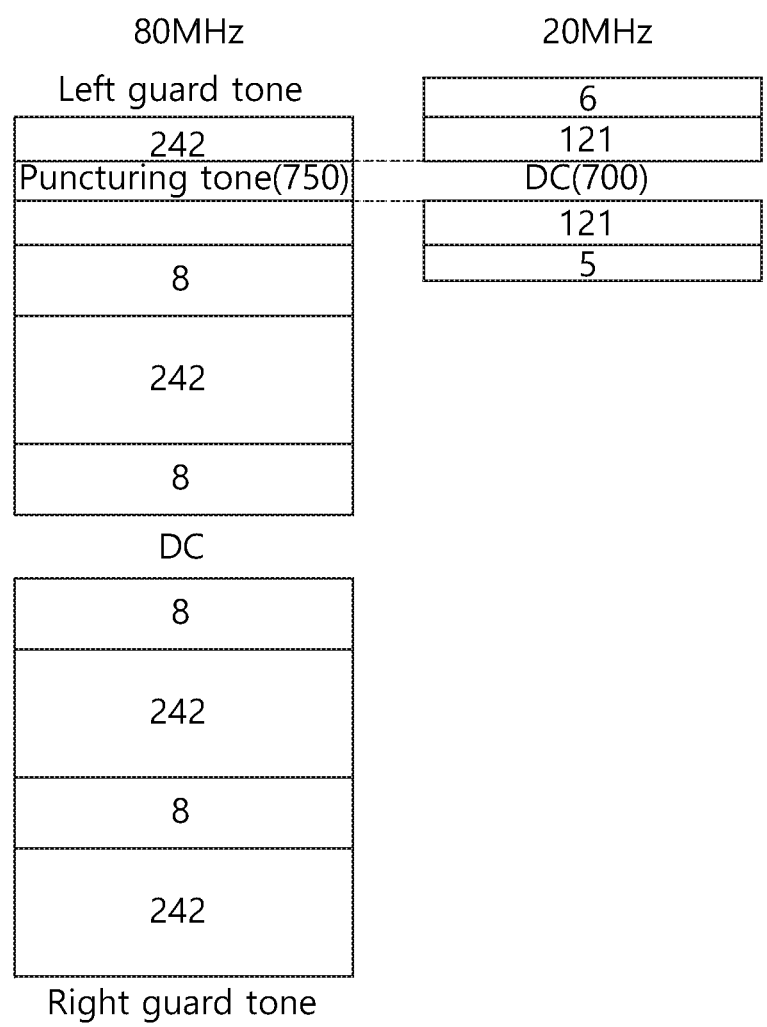
FIG. 7 is a conceptual view illustrating a resource allocation method within a 20 MHz bandwidth according to an exemplary embodiment of the present invention.

FIG. 7 is a conceptual view illustrating a resource allocation method within a 20 MHz bandwidth according to an exemplary embodiment of the present invention.

FIG. 7 discloses a resource allocation within the 20 MHz bandwidth additionally considering the DC tone within the 20 MHz bandwidth.

Referring to FIG. 7, n number of DC tones 700 may be included in the 20 MHz bandwidth in addition to the left guard tone/right guard tone/resource unit of 242 tones (hereinafter referred to as 242-tone resource unit (20 MHz)). In this case, tones corresponding to the positions of the n number of DC tones 700 in the 242-tone resource unit (hereinafter referred to as 242-tone resource unit (80 MHz)), which is allocated to a location corresponding to the 242-tone resource unit being allocated within the 20 MHz bandwidth, may be punctured (or processed with puncturing). More specifically, the position of the DC tone 700 defined in the 20 MHz bandwidth may be configured to be identical to the position of a puncturing tone 750, which is included in the 242-tone resource unit (80 MHz).

If the number of tones being allocated as the DC 700 within the 20 MHz bandwidth is equal to 3, the 3 tones corresponding to the position of the DC tone, which is positioned at the center of the 242-tone resource unit (80 MHz), may be punctured. Alternatively, if the number of tones being allocated as the DC 700 within the 20 MHz bandwidth is equal to 5, the 5 tones corresponding to the position of the DC tone, which is positioned at the center of the 242-tone resource unit (80 MHz), may be punctured.

In case the number if DC tones 700 being allocated within the 20 MHz bandwidth is not small, the number of tones being punctured in the 242-tone resource unit (80 MHz) may become larger. The increase in the number of puncturing tones may lead to a loss in wireless resource within the 80 MHz bandwidth.

Hereinafter, the exemplary embodiment of the present invention discloses a method for reducing the loss in wireless resource, which is caused by an increase in the number of puncturing tones.

Figure 8:
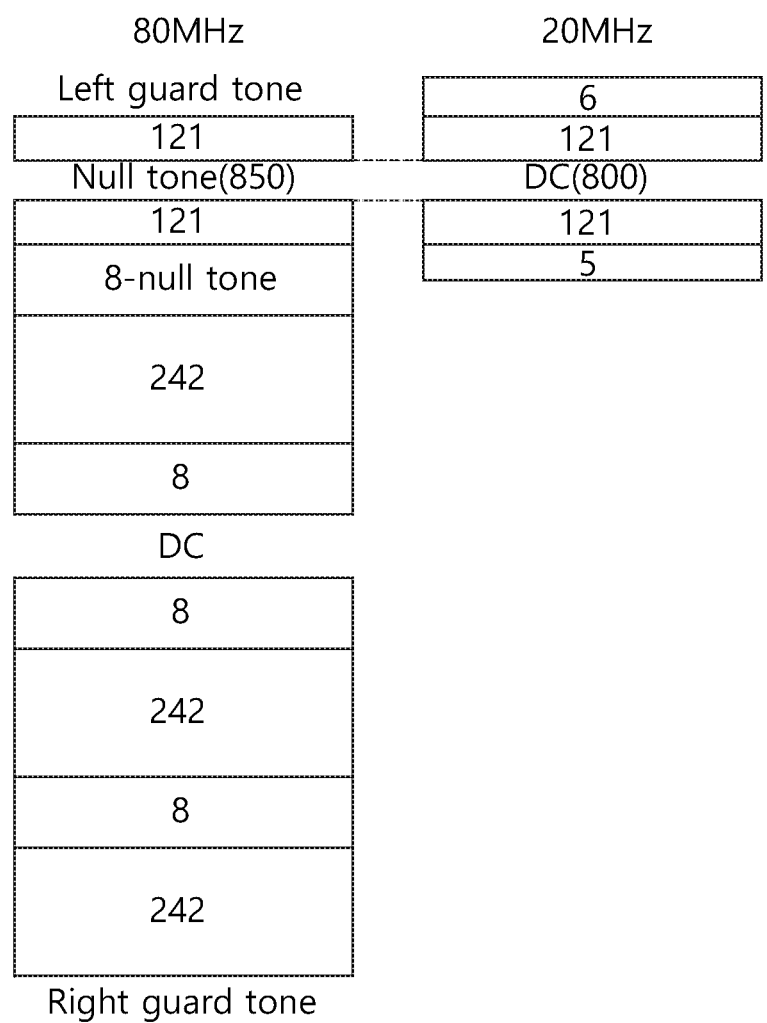
FIG. 8 is a conceptual view illustrating a resource allocation method within a 20 MHz bandwidth according to an exemplary embodiment of the present invention.

FIG. 8 is a conceptual view illustrating a resource allocation method within a 20 MHz bandwidth according to an exemplary embodiment of the present invention.

FIG. 8 discloses a resource allocation within the 20 MHz bandwidth additionally considering the DC tone within the 20 MHz bandwidth. Most particularly, disclosed herein is a method for reducing the loss in wireless resource, which is caused by an increase in the number of puncturing tones.

Null tones 850 corresponding to the number of DC tones 800 may also be inserted in the 242-tone resource unit (80 MHz) so as to correspond to the DC tones, which are defined in the 20 MHz bandwidth. Null tones 850 refers to all types of empty subcarrier that does not carry any signal, such as data.

At this point, part of the guard tones allocated to the 80 MHz bandwidth may be used as null tones 850 and included in the 242-tone resource unit (80 MHz).

The number and position of the null tones being included in the 242-tone resource unit (80 MHz) may be the same as the number and position of DC tones, which are defined in the 20 MHz bandwidth.

This method may be applied to the above-described resource allocation method within the 80 MHz bandwidth and resource allocation method within the 20 MHz bandwidth, which are disclosed in FIG. 2 to FIG. 5.

Figure 9:
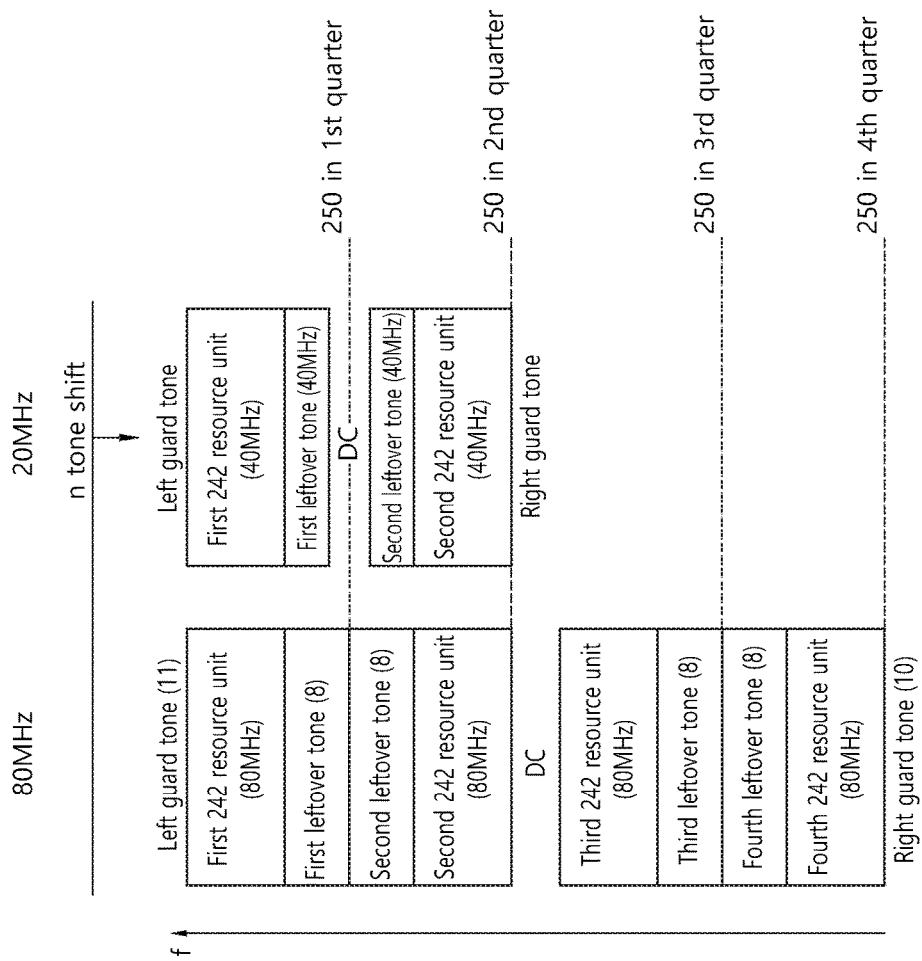
FIG. 9 is a conceptual view illustrating a resource allocation method within a 40 MHz bandwidth according to an exemplary embodiment of the present invention.

FIG. 9 is a conceptual view illustrating a resource allocation method within a 40 MHz bandwidth according to an exemplary embodiment of the present invention.

FIG. 9 discloses a tone numerology for an STA having a 40 MHz front-end bandwidth considering the resource allocation within the 80 MHz bandwidth, which is disclosed on the left side of FIG. 2.

Referring to FIG. 9, the resource allocation for the STA having a 40 MHz front-end bandwidth may be performed based on a left guard tone, a first 242-tone resource unit (40 MHz), a first leftover tone (40 MHz), a DC tone, a second leftover tone (40 MHz), a second 242-tone resource unit (40 MHz), and a right guard tone.

For example, the allocation position of the first 242-tone resource unit (80 MHz) being adjacent to the 11-tone left guard tone, which is allocated within the 80 MHz bandwidth, and the allocation position of the first 242-tone resource unit (40 MHz), which is allocated within the 40 MHz bandwidth, may be configured to be identical to one another. Additionally, the allocation position of the second 242-tone resource unit (80 MHz) being adjacent to the 11-tone left guard tone, which is allocated within the 80 MHz bandwidth, and the allocation position of the second 242-tone resource unit (40 MHz), which is allocated within the 40 MHz bandwidth, may be configured to be identical to one another. For the above-described configuration of the allocation positions within the 40 MHz bandwidth, shifting of the allocation start point of the left guard tone may be performed.

In order to adjust the above-described position configuration, the sum of the first leftover tone, DC tone, and second leftover tone may be configured to be equal to 16 tones, and the remaining tones (512 tones−(484 tones+16 tones)=12 tones) may be configured as the left guard tone and the right guard tone.

Figure 10:
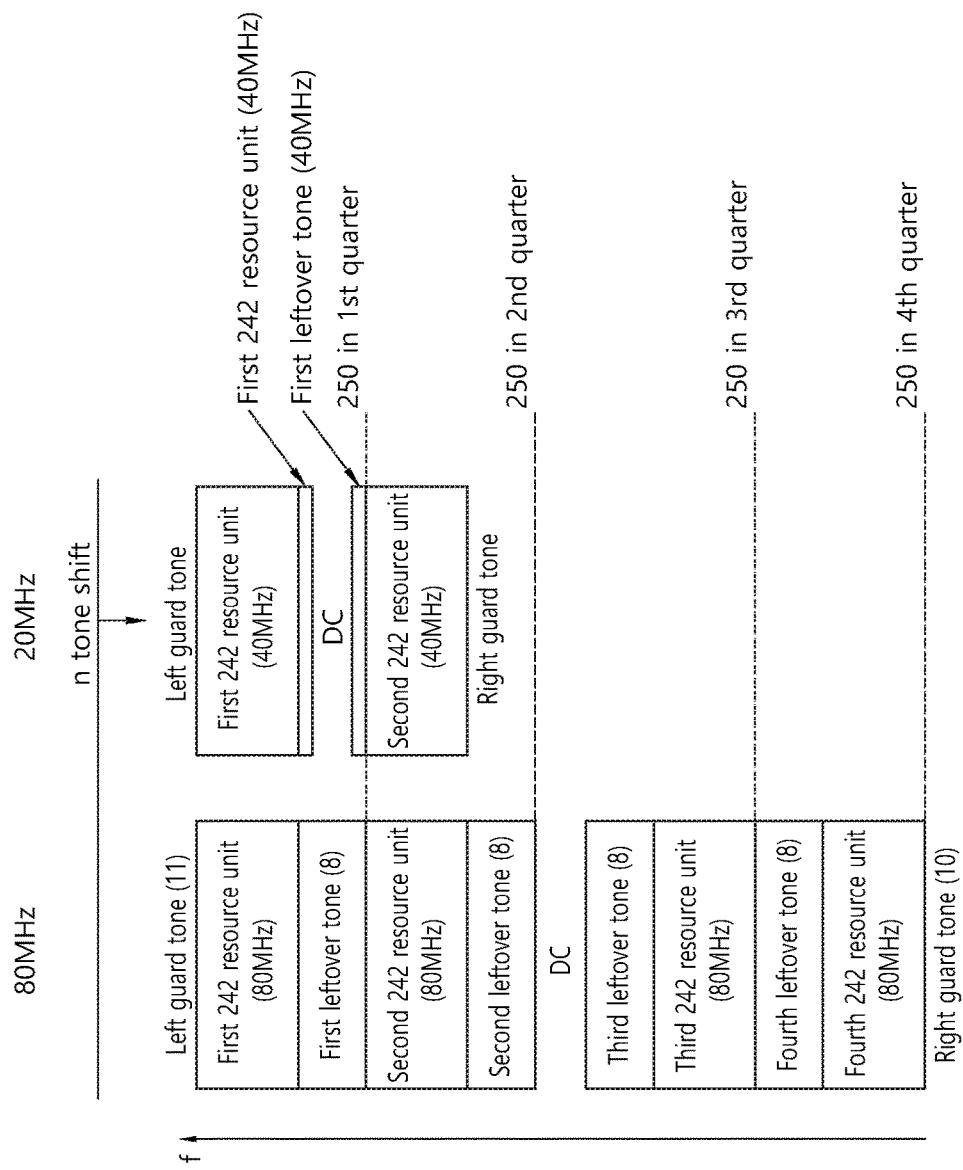
FIG. 10 is a conceptual view illustrating a resource allocation method within a 40 MHz bandwidth according to an exemplary embodiment of the present invention.

FIG. 10 is a conceptual view illustrating a resource allocation method within a 40 MHz bandwidth according to an exemplary embodiment of the present invention.

FIG. 10 discloses a tone numerology for an STA having a 40 MHz front-end bandwidth considering the resource allocation within the 80 MHz bandwidth, which is disclosed in the middle of FIG. 2.

Referring to FIG. 10, the resource allocation for the STA having a 40 MHz front-end bandwidth may be performed based on a left guard tone, a first 242-tone resource unit (40 MHz), a first leftover tone (40 MHz), a DC tone, a second leftover tone (40 MHz), a second 242-tone resource unit (40 MHz), and a right guard tone.

For example, the allocation position of the first 242-tone resource unit (80 MHz) being adjacent to the 11-tone left guard tone, which is allocated within the 80 MHz bandwidth, and the allocation position of the first 242-tone resource unit (40 MHz), which is allocated within the 40 MHz bandwidth, may be configured to be identical to one another. Additionally, the allocation position of the second 242-tone resource unit (80 MHz) being adjacent to the 11-tone left guard tone, which is allocated within the 80 MHz bandwidth, and the allocation position of the second 242-tone resource unit (40 MHz), which is allocated within the 40 MHz bandwidth, may be configured to be identical to one another. For the above-described configuration of the allocation positions within the 40 MHz bandwidth, shifting of the allocation start point of the left guard tone may be performed.

In order to adjust the above-described position configuration, the sum of the first leftover tone, DC tone, and second leftover tone may be configured to be equal to 8 tones, and the remaining tones (512 tones−(484 tones+8 tones)=20 tones) may be configured as the left guard tone and the right guard tone.

Alternatively, the DC tone may be configured to be equal to 8 tones without defining the first leftover tone and the second leftover tone.

Figure 11:
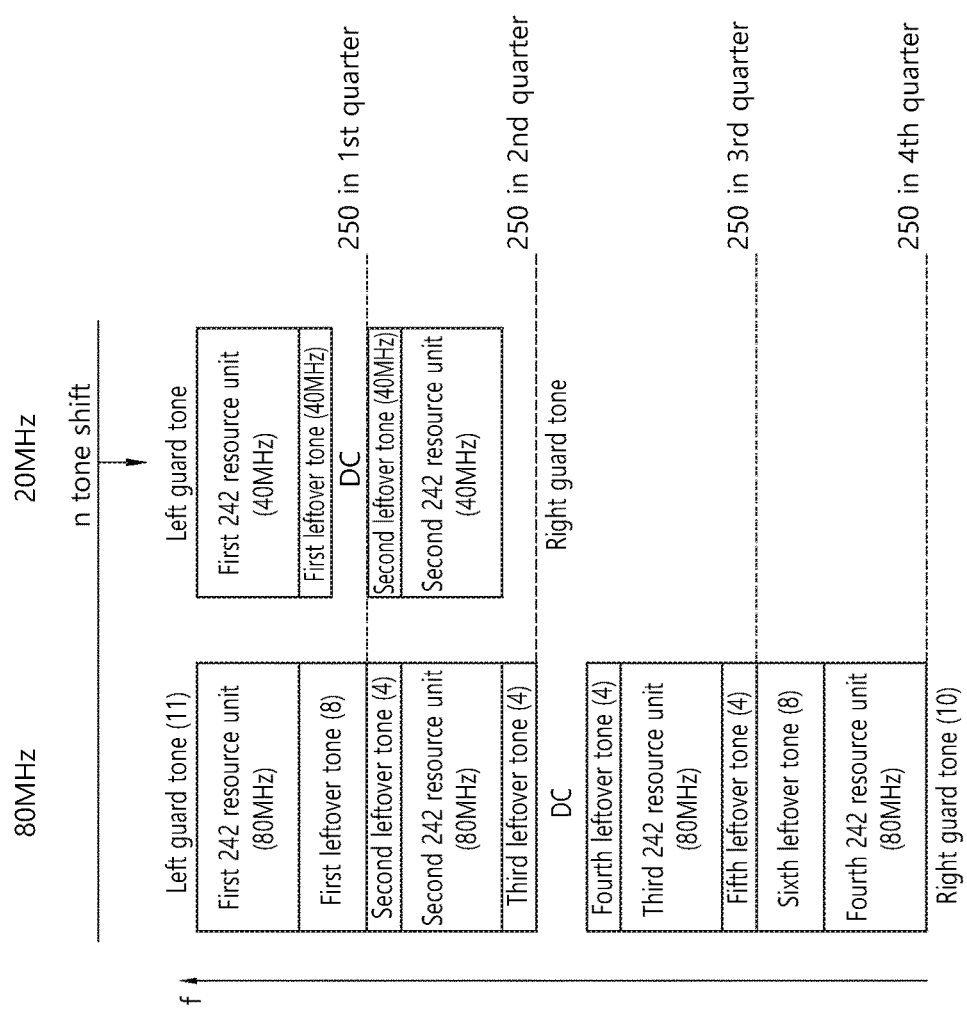
FIG. 11 is a conceptual view illustrating a resource allocation method within a 40 MHz bandwidth according to an exemplary embodiment of the present invention.

FIG. 11 is a conceptual view illustrating a resource allocation method within a 40 MHz bandwidth according to an exemplary embodiment of the present invention.

FIG. 11 discloses a tone numerology for an STA having a 40 MHz front-end bandwidth considering the resource allocation within the 80 MHz bandwidth, which is disclosed on the right side of FIG. 2.

Referring to FIG. 11, the resource allocation for the STA having a 40 MHz front-end bandwidth may be performed based on a left guard tone, a first 242-tone resource unit (40 MHz), a first leftover tone (40 MHz), a DC tone, a second leftover tone (40 MHz), a second 242-tone resource unit (40 MHz), and a right guard tone.

For example, the allocation position of the first 242-tone resource unit (80 MHz) being adjacent to the 11-tone left guard tone, which is allocated within the 80 MHz bandwidth, and the allocation position of the first 242-tone resource unit (40 MHz), which is allocated within the 40 MHz bandwidth, may be configured to be identical to one another. Additionally, the allocation position of the second 242-tone resource unit (80 MHz) being adjacent to the 11-tone left guard tone, which is allocated within the 80 MHz bandwidth, and the allocation position of the second 242-tone resource unit (40 MHz), which is allocated within the 40 MHz bandwidth, may be configured to be identical to one another. For the above-described configuration of the allocation positions within the 40 MHz bandwidth, shifting of the allocation start point of the left guard tone may be performed.

In order to adjust the above-described position configuration, the sum of the first leftover tone, DC tone, and second leftover tone may be configured to be equal to 12 tones, and the remaining tones (512 tones−(484 tones+16 tones)=16 tones) may be configured as the left guard tone and the right guard tone.

Although the allocation of the first 242-tone resource unit (40 MHz) and the second 242-tone resource unit (40 MHz) respectively corresponding to the third 242-tone resource unit (80 MHz) and the fourth 242-tone resource unit (80 MHz) is not disclosed in FIG. 9 to FIG. 11, the corresponding resource units may be allocated by using the same allocation method as the first 242-tone resource unit (40 MHz) and the second 242-tone resource unit (40 MHz) respectively corresponding to the first 242-tone resource unit (80 MHz) and the second 242-tone resource unit (80 MHz).

Figure 12:
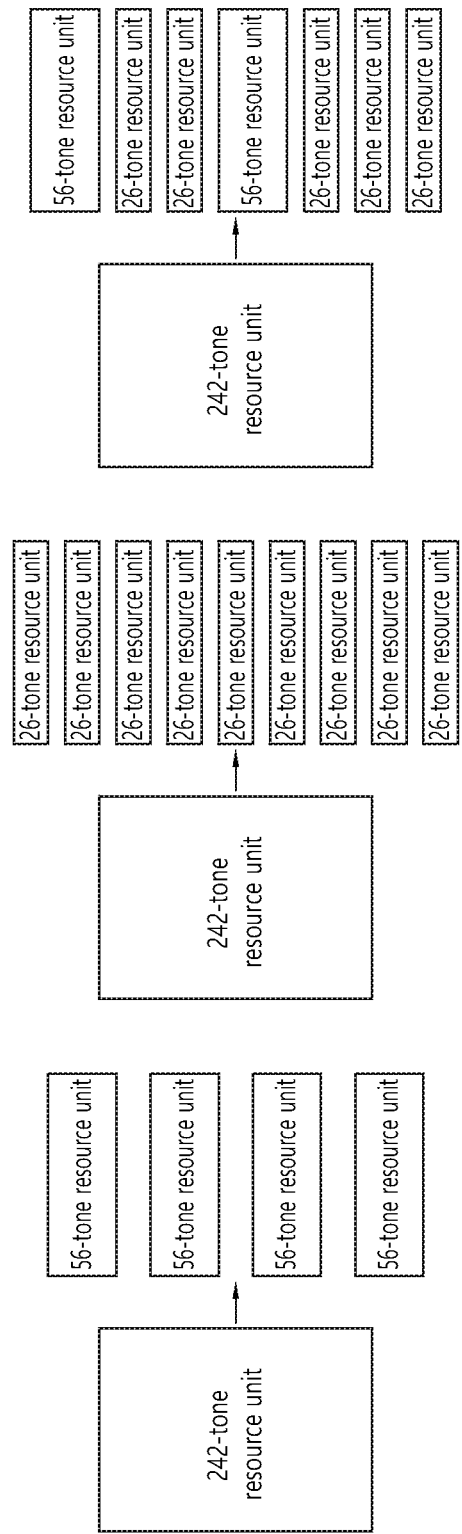
FIG. 12 is a conceptual view illustrating a division of a 242-tone resource unit according to an exemplary embodiment of the present invention.

FIG. 12 is a conceptual view illustrating a division of a 242-tone resource unit according to an exemplary embodiment of the present invention.

FIG. 12 discloses a method of dividing the 242-tone resource unit to smaller resource units (56-tone resource units, 26-tone resource units).

Referring to FIG. 12, according to the exemplary embodiment of the present invention, the 242-tone resource unit may be divided into a combination of resource unit having relatively smaller sizes and may then be used. For example, the 242-tone resource unit may be configured based on at least one 56-tone resource unit and/or at least one 26-tone resource unit.

Referring to the left side of FIG. 12, four 56-tone resource units (56 tones*4=224 tones) may be used instead of the 242-tone resource unit. In this case, a sufficient number of leftover tones may be included in the 242-tone resource unit. Accordingly, the leftover tones may be used as guard tones.

Referring to the middle of FIG. 12, nine 26-tone (26 tone*9=234 tones) resource units may be used instead of the 242-tone resource unit. In this case, 8 tones of leftover tones may be included in the 242-tone resource unit, and the 8-tone leftover tone may be used as guard tones for the nine 26-tone resource units.

Referring to the right side of FIG. 12, two 56-tone resource units and five 26-tone resource units may be used instead of the 242-tone resource unit. In this case, part of the resource unit (e.g., a 26-tone resource unit or a 13-tone resource unit, which corresponds to a divided half of the 26-tone resource unit) is not used, and, accordingly, a sufficient number of leftover tones may be ensured.

Alternatively, the configuration of the 56-tone resource unit and the 26-tone resource unit may be varied, so as to configure the 56-tone resource unit of two 26-tone resource units and leftover tones, or to configure the 56-tone resource unit by combining two 26-tone resource units and leftover tones.

In this case, four 56-tone resource units and one 26-tone resource unit or three 56-tone resource units and three 26-tone resource units may be used instead of the two 56-tone resource units and five 26-tone resource units.

Figure 13:
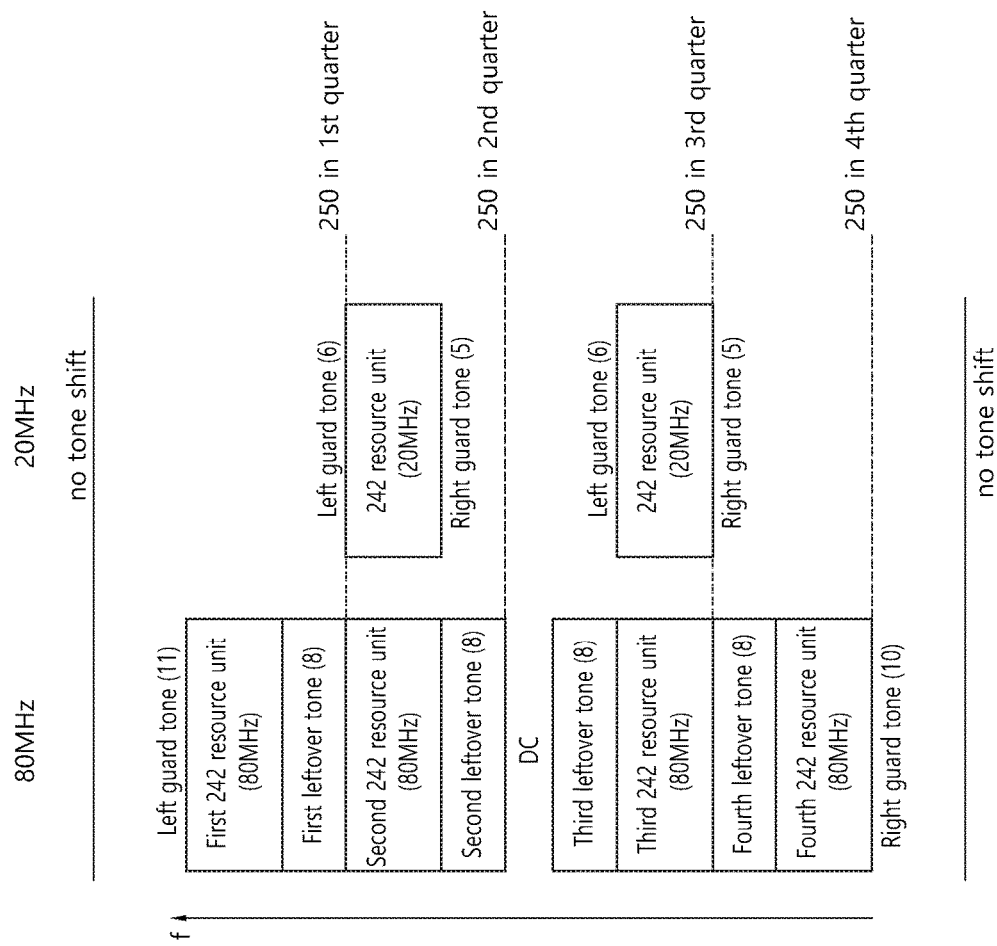
FIG. 13 is a conceptual view illustrating a resource allocation method within a 20 MHz bandwidth according to an exemplary embodiment of the present invention.

FIG. 13 is a conceptual view illustrating a resource allocation method within a 20 MHz bandwidth according to an exemplary embodiment of the present invention.

FIG. 13 discloses a resource allocation method within the 20 MHz bandwidth, in case shifting of the bandwidth cannot be performed. According to the exemplary embodiment of the present invention, in case of performing resource allocation for the 20 MHz bandwidth (or in case of performing resource allocation corresponding to an STA supporting the 20 MHz front-end bandwidth), shifting of the bandwidth may be impossible. This is because, in case shifting of the bandwidth is performed, since all of the resource blocks may be shifted, the bandwidth may be operated at a low efficiency.

Therefore, in case shifting of the bandwidth is not possible, the following resource allocation may be performed.

In the 80 MHz bandwidth, each of the left guard tone (or left-most guard tone) and the right guard tone (or right-most guard tone) may be respectively configured to be equal to 11 tones and 10 tones. Also, in the 80 MHz bandwidth, a left guard tone, a first 242-tone resource unit (80 MHz), a first leftover tone, a second 242-tone resource unit (80 MHz), a second leftover tone, a DC tone, a third leftover tone, a third 242-tone resource unit (80 MHz), a fourth leftover tone, a fourth 242-tone resource unit (80 MHz), and a right guard tone may be allocated.

The left guard tone (6 tones), the 242-tone resource unit (20 MHz)+DC tone, and right guard tone (5 tones) of the 20 MHz bandwidth may be allocated.

In this case, the 242-tone resource unit that is allocated in the 20 MHz bandwidth may be allocated to correspond to the second 242-tone resource unit (80 MHz) that is adjacent to the DC tone or the third 242-tone resource unit (80 MHz). In other words, the first 242-tone resource unit (80 MHz) and the fourth 242-tone resource unit (80 MHz), which are adjacent to the end of the 80 MHz bandwidth, may not correspond to the 242-tone resource unit (20 MHz).

At this point, the positions of the second 242-tone resource unit (80 MHz) and the third 242-tone resource unit (80 MHz) may be adjusted based on the allocation of the leftover tones and may then be configured to correspond to the 242-tone resource unit (20 MHz).

Figure 14:
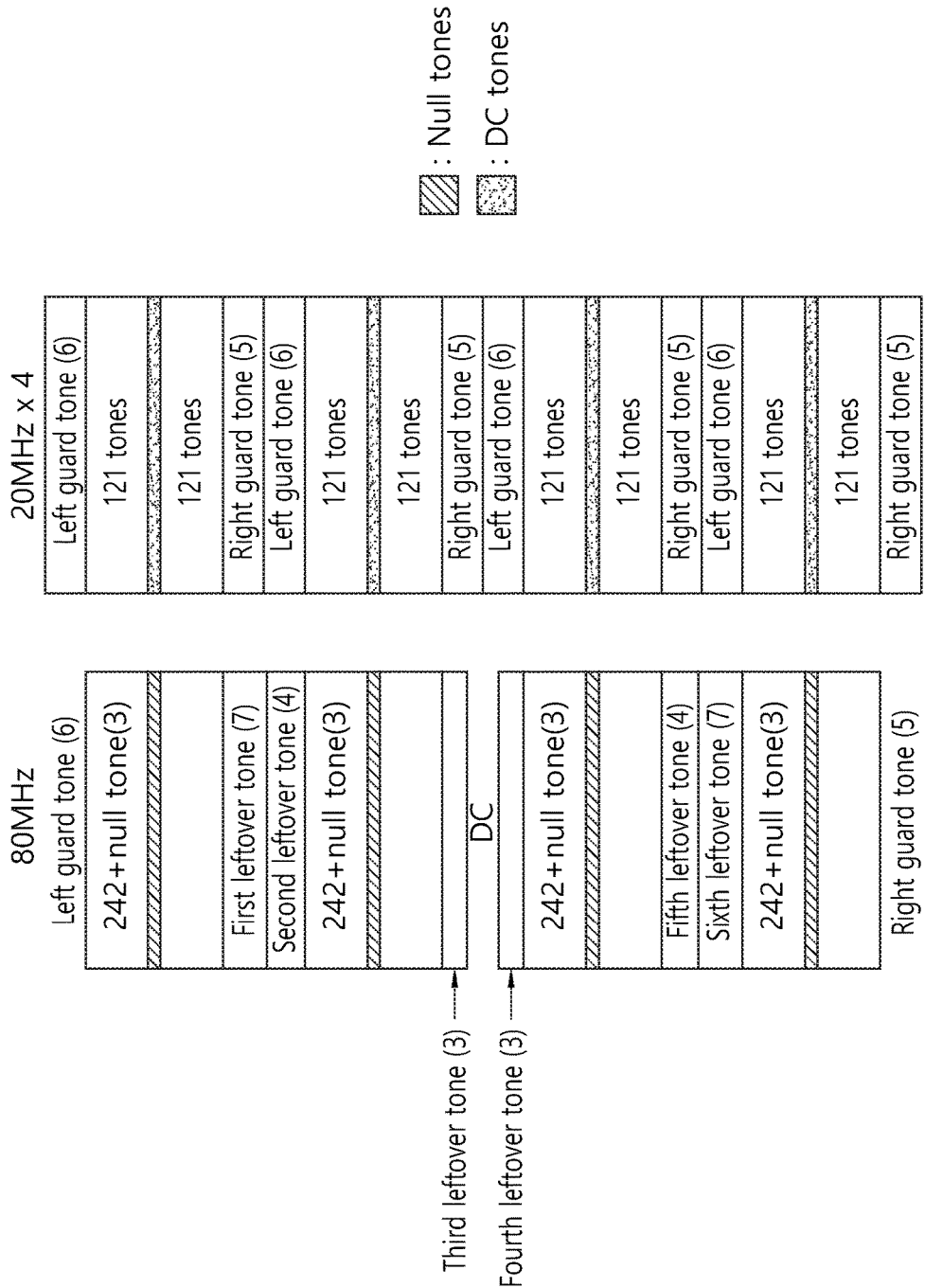
FIG. 14 is a conceptual view illustrating a resource allocation method within a 20 MHz bandwidth according to an exemplary embodiment of the present invention.

FIG. 14 is a conceptual view illustrating a resource allocation method within a 20 MHz bandwidth according to an exemplary embodiment of the present invention.

FIG. 14 also discloses a resource allocation method within the 20 MHz bandwidth, in case shifting of the bandwidth cannot be performed. FIG. 14 discloses a resource allocation method within the 20 MHz bandwidth without any shifting of the 20 MHz bandwidth based on an adjustment of the number of left guard tones/right guard tones, which are defined in the 80 MHz bandwidth.

In the 80 MHz bandwidth, the left guard tone may be configured to be equal to 6 tones, and the right guard tone may be configured to be equal to 5 tones. Also, in the 80 MHz bandwidth, a left guard tone, a first 242-tone resource unit (80 MHz), a second 242-tone resource unit (80 MHz), a DC tone, a third 242-tone resource unit (80 MHz), a fourth 242-tone resource unit (80 MHz), and a right guard tone may be allocated.

The left guard tone (6 tones), the 242-tone resource unit (20 MHz)+DC tone, and right guard tone (5 tones) of the 20 MHz bandwidth may be allocated.

In this case, the 242-tone resource unit (20 MHz) may correspond to the first 242-tone resource unit (80 MHz), the second 242-tone resource unit (80 MHz), the third 242-tone resource unit (80 MHz), or the fourth 242-tone resource unit (80 MHz). More specifically, the 242-tone resource unit (20 MHz) may correspond to any one 242-tone resource unit (80 MHz) among the four 242-tone resource units (80 MHz), which are included in the 80 MHz bandwidth.

Figure 15:
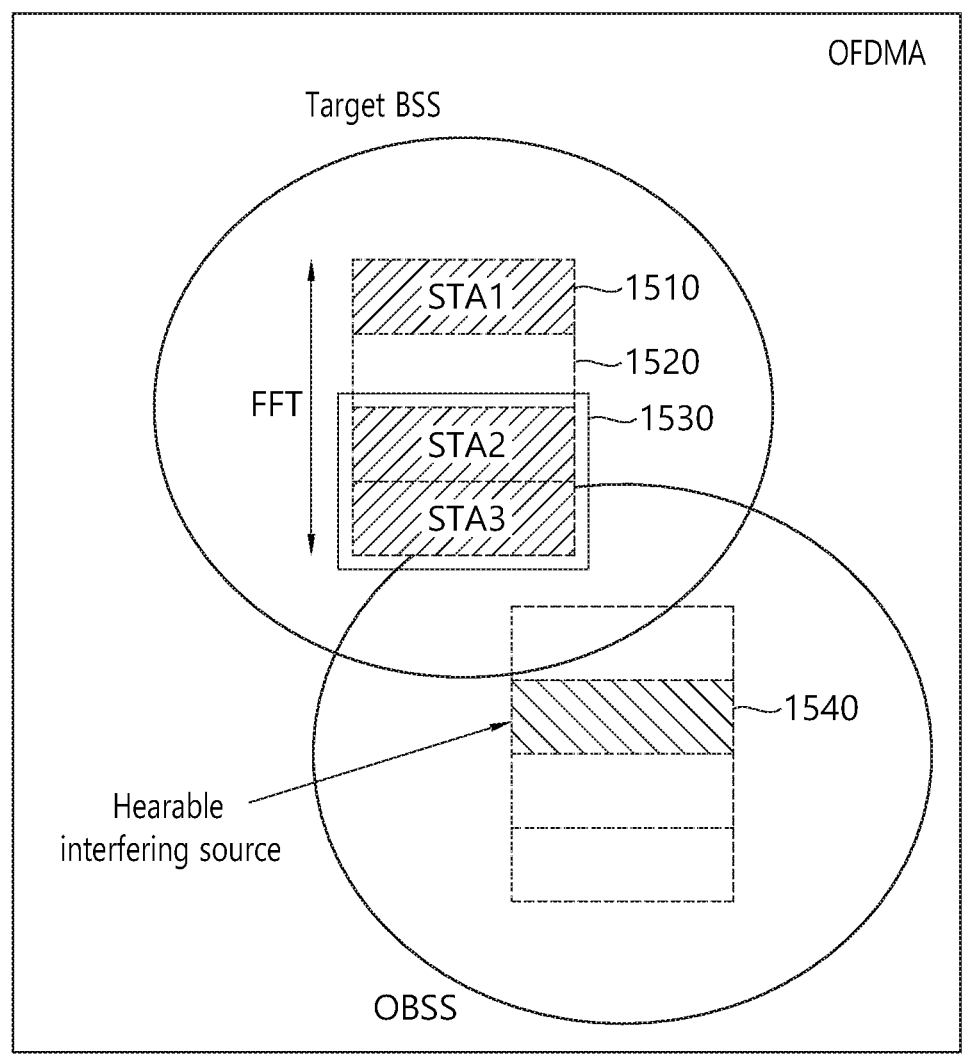
FIG. 15 is a block view illustrating a method for allocating a plurality of frequency resources according to an exemplary embodiment of the present invention.

FIG. 15 is a block view illustrating a method for allocating a plurality of frequency resources according to an exemplary embodiment of the present invention.

This exemplary embodiment may be applied to a non-contiguous OFDMA allocation, which is shown in FIG. 15. More specifically, as shown in FIG. 15, a sub-band 1530, which is used by STA2 and STA3 within a target BSS, may be non-contiguous to the sub-band 1510, which is used by STA1. In this case, in case a null sub-band is configured between the sub-band 1510 for STA1 and the sub-band for STA2/STA3, the corresponding null sub-band may cause interference between STA1 and STA2 due to IFFT/IDFT operations of the transmitting end.

For example, in case of independently filtering each sub-band by using two RF units, such problem of interference may be resolved. However, this exemplary embodiment proposes a method of minimizing the effects of interference even in a case of processing one OFDMA packet through a FFT/DFT module, which is included in one RF unit.

More specifically, as shown in FIG. 15, in case an OBSS overlapping with the target BSS by frequency overlap, and in case a hearable interfering source that can be received from the corresponding OBSS exists for a specific sub-band 1540, the interference between the sub-band 1510 for STA1 and the sub-band 1530 for STA2/STA3 may be reduced in the target BSS by using a method of controlling resource units in a frequency domain, which is adjacent to a non-contiguous band 1520.

More specifically, a first method of dividing a frequency chunk corresponding to a specific frequency band (e.g., 20 MHz) to multiple units (e.g., resource units corresponding to 26 tones) and allocating leftover tones, which are generated during the division procedure, to a frequency domain being adjacent to the non-contiguous band 1520 may be proposed. Also, a second method of dividing a frequency chunk corresponding to a specific frequency band (e.g., 20 MHz) to multiple units (e.g., resource units corresponding to 26 tones), including leftover tones, which are generated during the division procedure, between each unit (i.e., resource unit corresponding to 26 tones), and configuring one unit being most adjacent to the non-contiguous band 1520, among the multiple units, as a null unit (i.e., a unit/resource unit configured only of null tones) may also be proposed.

Since leftover tones, which are generated during the procedure of dividing a frequency chunk being configured of a relatively large number of tones (e.g., a chunk corresponding to 242 tones) into a plurality of units each having a relatively small size (e.g., a plurality of resource units each corresponding to 26 tones), may be used as a guard band for preventing interference, and since all of the plurality of units may be used for data transmission, the first method has an advantageous effect in the aspect of data transmission rate.

In comparison with the first method, since a frequency chunk being configured of a relatively large number of tones (e.g., a chunk corresponding to 242 tones) is divided into a plurality of units each having a relatively small size (e.g., a plurality of resource units each corresponding to 26 tones), and since at least one of the divided units is used as a guard band for preventing interference, although the data transmission rate may be relatively lower than the first method, the second method has a more advantageous effect in the aspect of interference prevention.

Hereinafter, the above-described first method and second method will be described in more detail.

Figure 16:
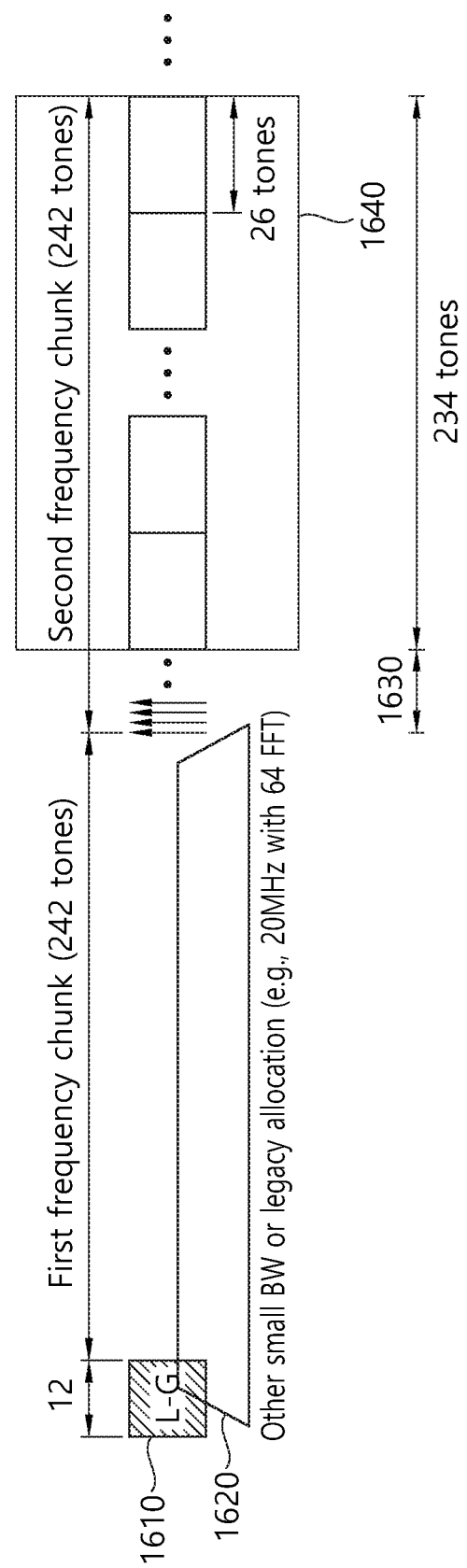
FIG. 16 is a diagram for describing an exemplary frequency resource allocation proposed in the exemplary embodiment of the present invention.

FIG. 16 is a diagram for describing an exemplary frequency resource allocation proposed in the exemplary embodiment of the present invention. The example shown in FIG. 16 is related to the above-described first method.

The example shown in FIG. 16 corresponds to an example, wherein each frequency chunk corresponds to 242 tones, or wherein each frequency chunk corresponds to 20 MHz. More specifically, as shown in the middle of FIG. 12, an example related to a case when a frequency chunk corresponding to 242 tones is configured only of 26-tone units (this term may also be expressed differently by using terms, such as resource unit, frequency unit, and so on) may be applied to FIG. 16.

As shown in FIG. 16, a 242-tone chunk (i.e., a frequency block/resource/section configured of 242 contiguous tones) may be configured to have 8 tones of leftover tones, which remain after excluding 234 tones (26*9=234) be inserted in a gap between 242-tone chunks. In other words, a second frequency chunk of FIG. 16 may be divided into a frequency domain 1640 being allocated to 234 data tones and a frequency domain 1630 corresponding to the_8 leftover tones. More specifically, the allocation method that is described above in FIG. 3 to FIG. 14 may be additionally changed by the method of FIG. 16. For example, the 242-tone resource unit (i.e., chunk or 242-tone block), which is used in the example shown in FIG. 3 to FIG. 14, becomes equal to 234 tones, and the remaining resource unit corresponding to 8 tones or 4 tones may be directly used as leftover tones without modification. In FIG. 16, arrows being inserted between chunks indicate null tones. The number of null tones shown in the drawing may be determined in accordance with the detailed number proposed in the exemplary embodiment of the present invention. In the 80 MHz bandwidth, a structure of inserting one more unit corresponding to 26 tones near the DC tone may be configured. In this case, in order to use the 26-tone unit that is inserted in the center as data or control signal, a specific number of tones may be inserted in a structure corresponding to . . . (null tone)/13/DC/13/ (null tone) . . . . In this case, the number of null tones may be equal to 8 or 4.

As another example of the first method, each of the 13 tones positioned near the DC tone may be used as a gap between each tone block being configured of 234 tones, thereby being capable of using a larger number of chunks (corresponding to 242 tones) at the same time. More specifically, a tone plan may be configured of left guard tone (shown as the frequency domain 1610 in FIG. 16)/234/8/ 13/234/8/DC/8/234/13/8/234/right guard tone or may be configured of left guard tone/234/13/8/234/8/DC/8/234/8/ 13/234/right guard tone. In case the size of the left guard tone and the size of the right guard tone respectively corresponds to 12 tones and 11 tones, and when the DC tone is equal to 7 tones, this may be applied to fit a total 1024-point FFT. In this case, even if interference occurs due to a small bandwidth (BW) user or a legacy user being allocated to a specific chunk (e.g., a first frequency chunk of FIG. 16), it will be advantageous in that the allocation may also be performed to another chunk (e.g., a second frequency chunk corresponding to 242 tones in FIG. 16) excluding the corresponding chunk. Meanwhile, although FIG. 16 illustrates a case when a small BW user is allocated or a case when a user, wherein a 20 MHz data field is used by a 64-point FFT, is allocated (i.e., a case when an OBSS uses a PPDU according to the related art IEEE standard), the guard tone may be inserted also in a case when the OBSS allocates a data field according to the HE format to the corresponding frequency band 1620. This is because, since synchronization between the OBSS and the target BSS may not match, an adjacent channel interference may occur due to a side lobe of a signal transmitted from the OBSS.

As yet another example of the first method, (for simplicity in the implementation) if the tone design of each chunk is configured to be identical to one another as much as possible, when it is assumed that the size of the left guard tone and the size of the right guard tone is respectively equal to 12 tones and 11 tones, and that the size of the DC is equal to 7 tones (234+8=242 chunk configuration), a structure of left guard tone (12)/234/8/8/234/13/DC/13/234/8/8/234/ right guard tone (11) may be used. Alternatively, a structure of left guard tone (12)/234/11/12/234/6/DC/6/234/11/12/ 234/11 may be configured and used. The remaining chunk excluding the center may be configured of a repeated structure of 12/234/11.

Figure 17:
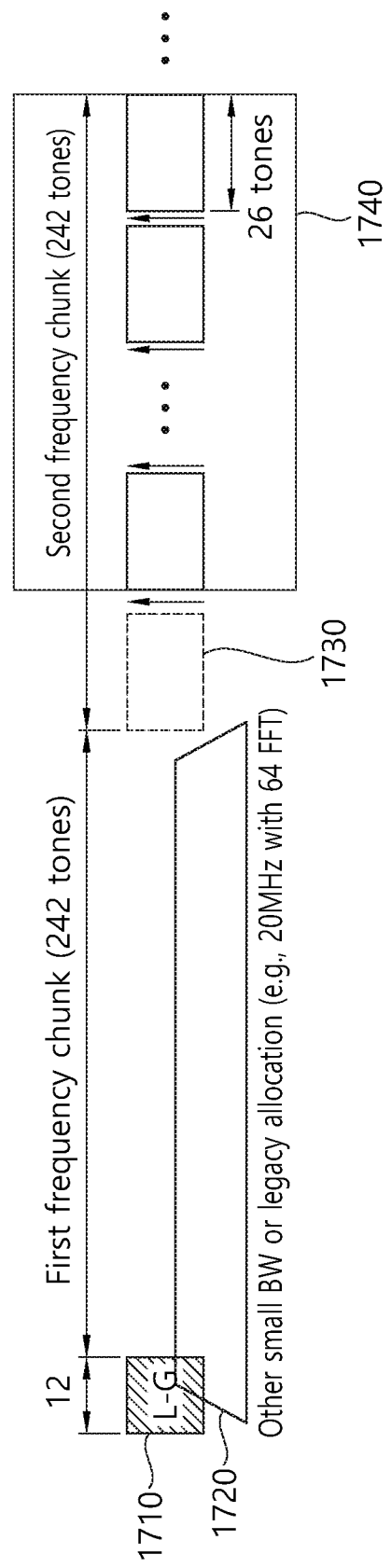
FIG. 17 is a diagram for describing an exemplary frequency resource allocation proposed in the exemplary embodiment of the present invention.

FIG. 17 is a diagram for describing an exemplary frequency resource allocation proposed in the exemplary embodiment of the present invention. The example shown in FIG. 17 is related to the above-described second method.

Just as in the first method, the second method has as advantageous effect of reducing interference in a non-contiguous OFDMA allocation. More specifically, as described above in FIG. 15, in case a hearable interfering source that can be received by the OBSS, and so on, exists within a specific sub-band 1520 and 1540, interference according to the non-contiguous OFDMA allocation is reduced by using a method of controlling a frequency domain that is adjacent to the corresponding sub-band.

More specifically, as shown in FIG. 17, a small bandwidth (BW) user or a legacy user may be allocated to a frequency domain corresponding to a first frequency chunk, thereby causing interference. For example, a hearable interfering source that can be received by the OBSS, which is shown in FIG. 15, may correspond to the first frequency chunk of FIG. 17, and the band for at least any one of STA1, STA2, and STA3 of FIG. 15 may correspond to the second frequency chunk of FIG. 17. More specifically, the frequency domain corresponding to the first frequency chunk of FIG. 17 may belong to the OBSS, and the domain corresponding to the second frequency chunk may belong to the target BSS, thereby causing a problem in the non-contiguous OFDMA allocation.

According to the example of FIG. 17, the second frequency chunk corresponding to 242 tones may be allocated to a unit (or resource unit) corresponding to 26 tones. In this case, a total of 234 tones may be used as 9 units, and the remaining 8 tones may be used as leftover tones. Such leftover tones may be used for control signal transmission or as a training signal, and so on, and may also be used for the purpose of ensuring guard band. Although the positions of the 8 leftover tones may be diversely configured, the leftover tones may be included in-between the 9 units so as to be used for the purpose of leftover tones (control signal transmission, training signal, ensuring guard band). More specifically, as shown in FIG. 17, a tone plan may be implemented by using a method of inserting one leftover tone between one 26-tone unit and another 26-tone unit.

Meanwhile, it is preferable that, among the 9 units each corresponding 26 tones, one unit 1730 that is most adjacent to the first frequency chunk is allocated to a null unit (or null resource unit), which only includes null tones. More specifically, in FIG. 17, it is preferable that one unit 1730 is not used as user data or for control signal transmission in order to perform interference reduction in accordance with the non-contiguous OFDMA. Although the number of units being allocated as the null unit is described to be equal to one unit in FIG. 17, the number of null units may be added in accordance with the data rate, and so on. Additionally, although the example of FIG. 17 illustrates a case when a small bandwidth (BW) user or a legacy user is allocated only to the first frequency chunk by the OBSS, for example, in case a third frequency chunk (not shown) exists on the right side of the second frequency, and in case a small bandwidth (BW) user or a legacy user is also allocated to the corresponding chunk by the OBSS, at least one unit (not shown) being adjacent to the third frequency chunk may be additionally allocated as a null unit. Meanwhile, although FIG. 17 illustrates a case when a small BW user is allocated or a case when a user, wherein a 20 MHz data field is used by a 64-point FFT, is allocated (i.e., a case when an OBSS uses a PPDU according to the related art IEEE standard), a null unit 1730 may be inserted also in a case when the OBSS allocates a data field according to the HE format to the corresponding frequency band 1720. This is because, since synchronization between the OBSS and the target BSS may not match, an adjacent channel interference may occur due to a side lobe of a signal transmitted from the OBSS.

Although the description of FIG. 16 and FIG. 17 is based on a chunk corresponding to 242 tones, the exemplary embodiment of the present invention will not be limited only to the detailed number presented above. Also, although FIG. 16 and FIG. 17 propose examples of dividing a chunk corresponding to 242 tones into units each being configured of 26 tones, the unit size is not required to be exactly equal to 26 tones. However, in case of FIG. 16, it is preferable that the tones remaining after dividing the chunk into units are positioned to be adjacent to the first frequency chunk. And, in case of FIG. 17, in case of dividing the chunk into units, among the divided units, it is preferable that at least one unit being most adjacent to the first frequency chunk only includes null tones and that a leftover tone is inserted between each of the divided units.

According to FIG. 16 and FIG. 17, it is preferable that a station (i.e., AP or non-AP STA) that intends to transmit data verifies that a small BW user or legacy user is being allocated to the first frequency chunk. Generally, since the wireless LAN system is capable of performing over-hearing, the target BSS may receive a packet from the OBSS and decode an SIG channel (e.g., SIG A and/or SIB-B according to standards, such as HE or VHT, and so on), thereby being capable of verifying that the first frequency chunk is being used by a small BW user or legacy user. For example, the SIG-A (e.g., HE SIG-A) being used in the OBSS may include an indicator indicating whether or not the corresponding 20 MHz band is being used or allocation information on the corresponding 20 MHz, thereby allowing the target BSS to determine whether or not to perform a non-contiguous OFDMA allocation due to the corresponding 20 MHz.

Additionally, or alternatively, the target BBS checks (or verifies) whether or not the first frequency chunk is being used for transmission by using an energy detection method, and, then, the target BSS may also determine whether or not a non-contiguous OFDMA allocation should be performed due to the corresponding 20 MHz.

Figure 18:
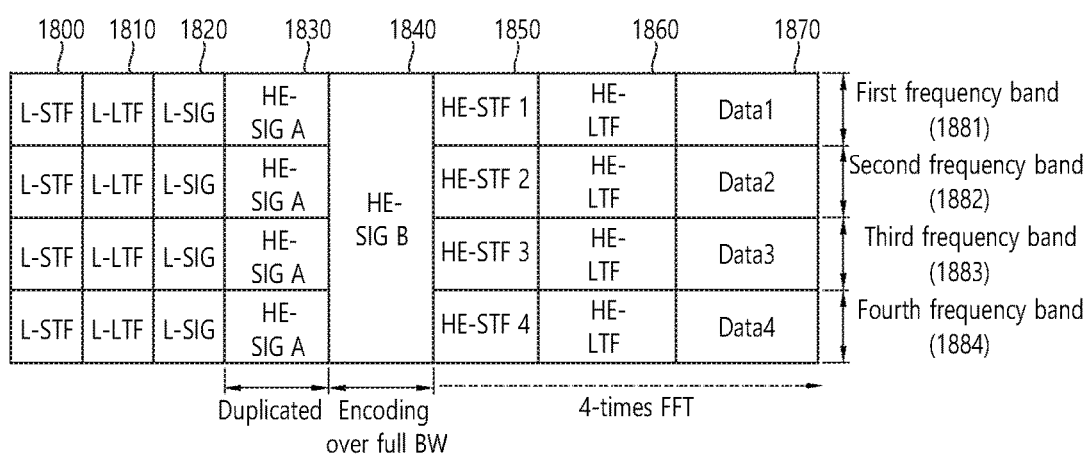
FIG. 18 is a conceptual view illustrating a DL/UL PPDU format that can be used in the exemplary embodiment of the present invention.

FIG. 18 is a conceptual view illustrating a DL/UL PPDU format that can be used in the exemplary embodiment of the present invention.

FIG. 18 discloses a PPDU format that is transmitted by the AP or non-AP STA based on OFDMA according to the exemplary embodiment of the present invention.

Referring to FIG. 18, a PPDU header of a MU PPDU may include a legacy-short training field (L-STF), a legacy-long training field (L-LTF), a legacy-signal (L-SIG), a high efficiency-signal A (HE-SIG A), a high efficiency-signal B (HE-SIG B), a high efficiency-short training field (HE-STF), a high efficiency-long training field (HE-LTF), and a data field (or MAC payload). The PPDU may be divided into a legacy part, which consists of a part starting from the PHY header to the L-SIG, and a high efficiency (HE) part, which consists of a part after the L-SIG.

The L-STF 1800 may include a short training orthogonal frequency division multiplexing (OFDM) symbol. The L-STF 1800 may be used for frame detection, automatic gain control (AGC), diversity detection, and coarse frequency/time synchronization.

The L-LTF 1810 may include a long training orthogonal frequency division multiplexing (OFDM) symbol. The L-LTF 1810 may be used for fine frequency/time synchronization and channel prediction.

The L-SIG 1820 may be used for transmitting control information. The L-SIG 1820 may include information on data transmission rate, data length, and so on.

The HE-SIG A 1830 may also include identification information for indicating a target STA that is to receive the DL MU PPDU. For example, the HE-SIG A 1830 may include an identifier of a specific STA (or AP) that is to receive the PPDU and information for indicating a group of specific STAs. For example, in case the HE-SIG A 1830 is being used for the DL MU PPDU, resource allocation information for the reception of the DL MU PPDU of the non-AP STA may also be included.

Additionally, the HE-SIG A 1830 may also include color bits information for BSS identification information, bandwidth information, tail bit, CRC bit, modulation and coding scheme (MCS) information on the HE-SIG B 1840, information on the number of symbols for the HE-SIG B 1840, and cyclic prefix (CP) (or guard interval (GI)) length information.

The HE-SIG B 1840 may include information on a length modulation and coding scheme (MCS) of a physical layer service data unit (PSDU) for each STA and a tail bit, and so on. Additionally, the HE-SIG B 1840 may also include information on the STA that is to receive the PPDU and resource allocation information based on OFDMA (or MU-MIMO information). In case the resource allocation information based on OFDMA (or MU-MIMO information) is included in the HE-SIG B 1840, the resource allocation information may not be included in the HE-SIG A 1830.

As described above, the HE-SIG A 1850 or the HE-SIG B 1860 may include resource allocation information (or virtual resource allocation information) corresponding to at least one receiving STA.

The fields before the HE-SIG B 1840 within the MU PPDU may each be transmitted from different transmission resources in a duplicated format. In case of the HE-SIG B

1840, the HE-SIG B 1840 being transmitted from part of the resource units may correspond to an independent field including separate information, and the HE-SIG B 1840 being transmitted from the remaining resource units may correspond to a duplicated format of the HE-SIG B 1840, which is transmitted from another resource unit. Alternatively, the HE-SIG B 1840 may be transmitted in an encoded format within all of the transmission resources. And, the fields after the HE-SIG B 1840 may include separate information for each of the plurality of STAs receiving the PPDU.

The HE-STF 1850 may be used for enhancing automatic gain control estimation in a multiple input multiple output (MIMO) environment or an OFDMA environment.

The HE-LTF 1860 may be used for estimating a channel in a MIMO environment or an OFDMA environment.

The FFT/IFFT size being applied to the HE-STF 1850 and the field after the HE-STF 1850 may be different from the FFT/IFFT size being applied to the field before the HE-STF 1850. For example, the FFT/IFFT size being applied to the HE-STF 1850 and the field after the HE-STF 1850 may be 4 times larger than the IFFT size being applied to the field before the HE-STF 1850. The STA may receive the HE-SIG A 1830 and may receive indication to receive a downlink PPDU based on the HE-SIG A 1830. In this case, the STA may perform decoding based on the HE-STF 1850 and the FFT size that is changed starting from the field after the HE-STF 1850. Conversely, in case the STA fails to receive indication to receive the downlink PPDU based on the HE-SIG A 1830, the STA may stop the decoding process and may perform network allocation vector (NAV) configuration. A cyclic prefix (CP) of the HE-STF 1850 may have a size that is larger than the CP of other fields, and, during such CP period, the STA may change the FFT size and may perform decoding on the downlink PPDU. For simplicity in the description, the part where the FFT/IFFT size that is 4 times larger is applied may be referred to as a second part of the PPDU, and the part where the initial FFT/IFFT size is applied may be referred to as a first part of the PPDU.

The access point (AP) may allocate each of the plurality of the wireless resources to each of the plurality of stations (STAs) within the entire bandwidth and may transmit a physical protocol data unit (PPDU) to each of the plurality of STAs through each of the plurality of wireless resources. As described above, the information on the allocation of each of the plurality of wireless resources to each of the plurality of STAs may be included in the HE-SIG A 1850 or the HE-SIG B 1860.

At this point, each of the plurality of wireless resources may correspond to a combination of a plurality of wireless resource units each being defined to have a different size within the frequency axis.

Each of the 4 frequency bands 1881, 1882, 1883, and 1884, which are shown in FIG. 18, may correspond to the frequency chunk shown in FIG. 16 and FIG. 17. For example, among the 4 frequency bands shown in the drawing, a small BW user or legacy user may be allocated by the OBSS for at least one band/region (or domain). For example, in case a small BW user or legacy user is allocated to the first frequency band 1881, the first method described in FIG. 16 or the second method described in FIG. 17 may be used for the second frequency band 1882.

For example, in case of a downlink communication, in case of allocating the second frequency band 1882, which is adjacent to the first frequency band 1881, for a second STA belonging to the target BSS, the AP may verify whether or not the first frequency band 1881 has been allocated to the first STA (small BW user or legacy user) belonging to the OBSS, and so on.

In case the first frequency band 1881 is allocated to the first STA, which belongs to a small BW user or legacy user, the AP of the target BSS may allocate at least one resource unit being most adjacent to the first frequency band 1881, among the multiple units (e.g., 9 resource units each corresponding to 26 tones) belonging to the second frequency band 1882, as a null resource unit so as to be used for the second STA.

In this case, one leftover tone may be included between each of the 9 resource units being included in the second frequency band 1882. Each of the 4 frequency bands 1881, 1882, 1883, and 1884, which are shown in FIG. 18, may correspond to the 20 MHz band, and only part of the frequency bands may be included in the 20 MHz band. For example, in case a first STA and a third STA both belonging to a small BW user or legacy user are allocated to the first frequency band and the third frequency band, the AP of the target BSS may allocate a resource unit being most adjacent to the first frequency band 1881 and a resource unit being most adjacent to the third frequency band 1883, among the multiple units (e.g., 9 resource units each corresponding to 26 tones) belonging to the second frequency band 1882, as a null resource unit so as to be used for the second STA.

Such operations performed in the downlink may also be applied in operations performed in the uplink.

Figure 19:
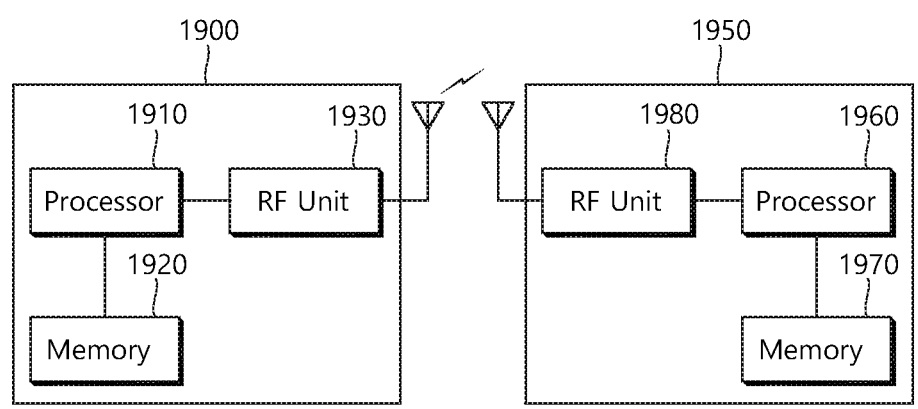
FIG. 19 is a block view illustrating a wireless device to which the exemplary embodiment of the present invention can be applied.

FIG. 19 is a block view illustrating a wireless device to which the exemplary embodiment of the present invention can be applied.

Referring to FIG. 19, as an STA that can implement the above-described exemplary embodiment, the wireless device may correspond to an AP 1900 or a non-AP station (STA) 1950.

The AP 1900 includes a processor 1910, a memory 1920, and a radio frequency (RF) unit 1930.

The RF unit 1930 is connected to the processor 1910, thereby being capable of transmitting and/or receiving radio signals (or wireless signals).

The processor 1910 implements the functions, processes, and/or methods proposed in the present invention. For example, the processor 1910 may be implemented to perform the operations of the AP according to the above-described exemplary embodiments of the present invention. The processor may perform the operations of the AP, which are disclosed in the exemplary embodiments of FIG. 1 to FIG. 18.

The non-AP STA 1950 includes a processor 1960, a memory 1970, and a radio frequency (RF) unit 1980.

The RF unit 1980 is connected to the processor 1960, thereby being capable of transmitting and/or receiving radio signals.

The processor 1960 implements the functions, processes, and/or methods proposed in the present invention. For example, the processor 1960 may be implemented to perform the operations of the non-AP STA according to the above-described exemplary embodiments of the present invention. The processor may perform the operations of the non-AP STA, which are disclosed in the exemplary embodiments of FIG. 1 to FIG. 18.

For example, the processor 1960 may receive downlink data or may transmit uplink data based on a resource unit (or wireless resource), which is scheduled by the AP.

The processor 1910 and 1960 may include an application-specific integrated circuit (ASIC), another chip set, a logical circuit, a data processing device, and/or a converter converting a baseband signal and a radio signal to and from one another. The memory 1920 and 1970 may include a read-only memory (ROM), a random access memory (RAM), a flash memory, a memory card, a storage medium, and/or another storage device. The RF unit 1930 and 1980 may include one or more antennas transmitting and/or receiving radio signals.

When the exemplary embodiment is implemented as software, the above-described method may be implemented as a module (process, function, and so on) performing the above-described functions. The module may be stored in the memory 1920 and 1970 and may be executed by the processor 1910 and 1960. The memory 1920 and 1970 may be located inside or outside of the processor 1910 and 1960 and may be connected to the processor 1910 and 1960 through a diversity of well-known means.

What is claimed is:

1. A method for transmitting a signal in a wireless LAN, comprising:
    allocating, by an access point (AR) including in a first basic service set (BSS), a first frequency band and a second frequency band,
    wherein a non-contiguous band exits between the first and second frequency band,
    wherein the non-contiguous band is overlapped with a hearable interfering source that can
be received from a second BSS, and
    wherein the second BSS is an overlapping basic service set (QBSS) for the first BSS: and
    transmitting, by the AR, a first signal to a first station through the first frequency band and a second signal to a second station through the second frequency band,
    wherein a first leftover tone is inserted in a resource unit (RU) closest to the non contiguous band in the first frequency band,
    wherein a second leftover tone is inserted in a RU closest to the non-contiguous band in
the second frequency band,
    wherein the first and second leftover tones have 8 tones respectively,
    wherein a first frequency resource through which the first signal is transmitted in the first frequency band has 234 tones, and
    wherein a second frequency resource through which the second signal is transmitted in the second frequency band has 234 tones.

2. The method of claim 1, wherein a neighboring AP is included in the second BSS.

3. The method of claim 1, wherein each of the first frequency band and the second frequency band relates to a 20 MHz bandwidth.

4. The method of claim 1, wherein, in case the AP allocates a third frequency band being adjacent to the second frequency band to a third station, among a plurality of resource units being included in the third frequency band, a resource unit being adjacent to the second frequency band is used as a data signal for the third station, and
    in case a neighboring AP allocates a third frequency band being adjacent to the second frequency band to the third station, among a plurality of resource units being included in the third frequency band, a resource unit being adjacent to the second frequency band is allocated as a null resource unit.

5. The method of claim 1, wherein the first signal or the second signal is included in a PPDU including a first part and a second part, wherein a first part of the PPDU is configured by a first point FFT calculation, wherein a second part of the PPDU is configured by a second point IFFT calculation, and wherein frequency bandwidths of the first part of the PPDU and the second part of the PPDU are configured to be equal to one another.

6. The method of claim 1,
    wherein a control signal and a training signal is transmitted through the first and second leftover tones, and
    wherein the first signal, the second signal, the control signal and the training signal are not transmitted through the null resource unit.

7. An access point (AP) included in a first basic service set (BSS) for transmitting a signal in a wireless LAN, the AP comprising:
    a radio frequency (RF) unit transmitting and receiving radio signals; and
    a processor being operatively connected to the RF unit, wherein the processor is configured to:
    allocate a first frequency band and a second frequency band,
    wherein a non-contiguous band exits between the first and second frequency band,
    wherein the non-contiguous band is overlapped with a hearable interfering source
        that can be received from a second BSS, and
    wherein the second BSS is an overlapping basic service set (QBSS) for the first BSS; and
    transmit a first signal to a first station through the first frequency band and a
        second signal to a second station through the second frequency band,
    wherein a first leftover tone is inserted in a resource unit (RU) closest to the non contiguous band in the first frequency band,
    wherein a second leftover tone is inserted in a RU closest to the non-contiguous band in the second frequency band,
    wherein the first and second leftover tones have 8 tones respectively,
    wherein a first frequency resource through which the first signal is transmitted in the first frequency band has 234 tones, and
    wherein a second frequency resource through which the second signal is transmitted in the second frequency band has 234 tones.

8. The AP of claim 7, wherein a neighboring AP is included in the second BSS.

9. The AP of claim 7, wherein each of the first frequency band and the second frequency band relates to a 20 MHz bandwidth.

10. The AP of claim 7, wherein, in case the AP allocates a third frequency band being adjacent to the second frequency band to a third station, among a plurality of resource units being included in the third frequency band, a resource unit being adjacent to the second frequency band is used as a data signal for the third station, and
    in case a neighboring AP allocates a third frequency band being adjacent to the second frequency band to the third station, among a plurality of resource units being included in the third frequency band, a resource unit being adjacent to the second frequency band is allocated as a null resource unit.

11. The AP of claim 7, wherein the first signal or the second signal is included in a PPDU including a first part and a second part, wherein a first part of the PPDU is configured by a first point FFT calculation, wherein a second part of the PPDU is configured by a second point IFFT calculation, and wherein frequency bandwidths of the first part of the PPDU and the second part of the PPDU are configured to be equal to one another.

12. The AP of claim 7,
wherein a control signal and a training signal is transmitted through the first and second leftover tones, and
wherein first signal, the second signal, the control signal and the training signal are not transmitted through the null resource unit.

\* \* \* \* \*